(12) United States Patent
Krishna et al.

(10) Patent No.: US 11,987,757 B2
(45) Date of Patent: May 21, 2024

(54) PROCESSES FOR PRODUCING DIESEL FROM UNCONVENTIONAL FEEDSTOCKS

(71) Applicant: CHEVRON U.S.A. INC., San Ramon, CA (US)

(72) Inventors: Kamala R. Krishna, Danville, CA (US); Yihua Zhang, Albany, CA (US); Guan-Dao Lei, Walnut Creek, CA (US); Adeola Florence Ojo, Pleasant Hill, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 129 days.

(21) Appl. No.: 17/138,260

(22) Filed: Dec. 30, 2020

(65) Prior Publication Data

US 2022/0204867 A1 Jun. 30, 2022

(51) Int. Cl.
*C10G 11/05* (2006.01)
*B01J 29/70* (2006.01)
*C10G 3/00* (2006.01)

(52) U.S. Cl.
CPC .............. *C10G 11/05* (2013.01); *B01J 29/703* (2013.01); *C10G 3/44* (2013.01); *B01J 2231/648* (2013.01); *C10G 2300/1014* (2013.01); *C10G 2400/04* (2013.01)

(58) Field of Classification Search
CPC .......... C10G 3/44; C10G 11/05; C10G 45/64; C10G 2300/1014; C10G 2300/1022; C10G 2400/04; B01J 29/703; B01J 2231/648; Y02P 30/20
See application file for complete search history.

(56) References Cited

U.S. PATENT DOCUMENTS

| | | | |
|---|---|---|---|
| 4,910,006 A | 3/1990 | Zones et al. | |
| 5,252,527 A * | 10/1993 | Zones | C01B 39/48 502/64 |
| 5,316,753 A | 5/1994 | Nakagawa | |
| 5,397,454 A | 3/1995 | Zones et al. | |
| 6,790,433 B2 | 9/2004 | Chen et al. | |
| 6,960,327 B2 | 11/2005 | Navrotsky et al. | |
| 7,468,126 B2 | 12/2008 | Zones et al. | |
| 9,920,260 B2 | 3/2018 | Ojo et al. | |
| 2005/0092651 A1* | 5/2005 | Zones | C10G 45/64 502/64 |
| 2006/0207166 A1* | 9/2006 | Herskowitz | C10L 1/08 44/385 |
| 2012/0101014 A1* | 4/2012 | Salazar-Guillen | C10G 3/42 44/307 |
| 2013/0001128 A1* | 1/2013 | Kibby | C10G 45/64 208/49 |
| 2017/0058209 A1* | 3/2017 | Ojo | B01J 29/7461 |
| 2017/0335216 A1* | 11/2017 | Hommeltoft | C07C 1/24 |

OTHER PUBLICATIONS

Briker, Y., et al.,"Diesel Fuel Analysis by GC-FIMS: Normal Paraffins, Isoparaffins and Cycloparaffins", Energy Fuels 2001, 15, 4, 996-1002.
Lobo, Raul F., et al., "New Description of the Disorder in Zeolite ZSM-48", J. Am. Chem. Soc. 2012, 124, 13222-13230.

* cited by examiner

*Primary Examiner* — Brian A McCaig
(74) *Attorney, Agent, or Firm* — Mark Warzel

(57) ABSTRACT

Described herein are processes for hydroisomerising an unconventional feedstock using a hydroisomerisation catalyst comprising zeolite SSZ-91, zeolite SSZ-32, or zeolite SSZ-32x to provide a diesel fuel.

36 Claims, 1 Drawing Sheet

PROCESSES FOR PRODUCING DIESEL FROM UNCONVENTIONAL FEEDSTOCKS

TECHNICAL FIELD

Described herein are new processes for hydroisomerising unconventional feedstocks, such as biocomponent feeds or Fischer-Tropsch feeds, using a hydroisomerisation catalyst containing zeolite SSZ-91, zeolite SSZ-32x, zeolite SSZ-32, or combinations thereof.

BACKGROUND

Unconventional feedstocks, such as biocomponent feeds or Fischer-Tropsch feeds are known to exhibit poor cold flow properties. It is desirable to produce diesel fuels with improved cold flow properties to address the problem of fuel filters blocking in cold conditions. Conventionally, cold flow properties of diesel fuel produced from unconventional feedstocks are improved by adding additives to decrease the cloud point and/or pour point of the resulting diesel fuel. However, such conventional procedures may be costly and inefficient, for example reducing the diesel fuel yield.

The present invention aims to provide a process to produce diesel having improved cold flow properties from unconventional feedstocks with improved efficiency and improved yield.

SUMMARY

This invention relates to processes for efficiently converting unconventional feedstocks, such as biocomponent feeds and Fischer-Tropsch feeds, into high-grade products, including diesel fuels having a low pour point and a low cloud point.

According to a first aspect, a process for hydroisomerising a diesel feedstock is provided, the process comprising contacting a diesel feedstock with a hydroisomerisation catalyst, wherein the diesel feedstock comprises or is a biocomponent feed or a Fischer-Tropsch feed, and the hydroisomerisation catalyst comprises zeolite SSZ-91, zeolite SSZ-32 or zeolite SSZ-32x.

According to a second aspect, a process for upgrading a diesel feedstock is provided, the process comprising:
contacting a diesel feedstock with a hydroisomerisation catalyst under hydroisomerisation conditions to provide a diesel fuel having a reduced cloud point and a reduced pour point compared to the cloud point and pour point of the diesel feedstock,
wherein the diesel feedstock comprises or is a biocomponent feed or a Fischer Tropsch feed, and the hydroisomerisation catalyst comprises zeolite SSZ-91, zeolite SSZ-32 or zeolite SSZ-32x.

According to a third aspect, provided herein is the use of a hydroisomerisation catalyst comprising zeolite SSZ-91, zeolite SSZ-32 or zeolite SSZ-32x to provide a diesel fuel exhibiting a lower cloud point and a lower pour point compared to the cloud point and pour point of a diesel feedstock from which the diesel fuel is produced, wherein the diesel fuel is produced by contacting the diesel feedstock and the hydroisomerisation catalyst and the diesel feedstock comprises a biocomponent feed or a Fischer-Tropsch feed.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DETAILED DESCRIPTION

Introduction

Figure 1:
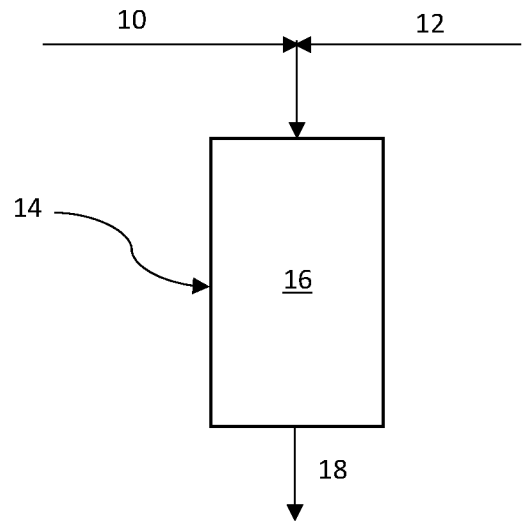
FIG. 1 schematically represents a process for hydroisomerising diesel feedstocks according to an embodiment of the present invention.

The term "unconventional feedstock" as used herein refers to biocomponent feeds and Fischer-Tropsch feeds. The unconventional feedstock has a boiling range suitable for producing a diesel fuel therefrom. In embodiments, the unconventional feedstock has boiling points in the range of about 250° F. (121° C.) to about 900° F. (482° C.), for example about 300° F. (149° C.) to about 900° F. (482° C.), or about 250° F. (121° C.) to about 800° F. (427° C.).

The term "biocomponent feed" used herein is used to refer to a diesel feedstock derived from a biocomponent-containing source, such as a plant based oil or fat, an animal based oil or fat, a fish based oil or fat or algae based oil or fat. In embodiments, the biocomponent feed has boiling points in the range of about 250° F. (121° C.) to about 900° F. (482° C.), for example about 300° F. (149° C.) to about 900° F. (482° C.), about 400° F. to about 900° F. (about 204° C. to about 482° C.), about 500° F. to about 900° F. (about 260° C. to about 482° C.), about 600° F. (316° C.) to about 900° F. (482° C.), or about 700° F. (371° C.) to about 900° F. (482° C.) at atmospheric pressure. In embodiments, the biocomponent feed has a 90% distillation temperature of less than about 700° F. (371° C.), for example less than about 650° F. (343° C.). In embodiments, the biocomponent feed has a 90% distillation temperature in the range of about 550° F. (288° C.) to about 750° F. (399° C.), for example about 550° F. (288° C.) to about 700° F. (371° C.), about 600° F. (316° C.) to about 700° F. (371° C.). The 90% distillation temperature may be determined in accordance with ASTM D 2887. In embodiments, the biocomponent feed has a 5% distillation temperature in the range of about 250° F. (121° C.) to about 600° F. (316° C.), for example about 300° F. (149° C.) to about 600° F. (316° C.), or about 400° F. (about 204° C.) to about 600° F. (316° C.). The 5% distillation temperature may be determined in accordance with ASTM D 2887. In embodiments, the biocomponent feed has a 90% distillation temperature in the range of about 550° F. (about 288° C.) to about 750° F. (about 399° C.) and a 5% distillation temperature in the range of about 250° F. (121° C.) to about 600° F. (316° C.). In embodiments, the biocomponent feed has a 90% distillation temperature in the range of about 550° F. (288° C.) to about 700° F. (371° C.) and a 5% distillation temperature in the range of about 300° F. (149° C.) to about 600° F. (316° C.). In embodiments, the biocomponent feed has a 90% distillation temperature which is greater than about 600° F. (316° C.), for example from about 605° F. (about 318° C.) to about 675° F. (357° C.), and a 5% distillation temperature which is less than about 600° F. (316° C.), for example from about 540° F. (282° C.) to about 580° F. (304° C.). In embodiments, the biocomponent feed has a 90% distillation temperature in the range of equal to or greater than about 600° F. (316° C.) to about 700° F.

(371° C.) and a 5% distillation temperature in the range of about 400° F. (204° C.) to equal to or less than about 600° F. (316° C.).

The term "Fischer-Tropsch feed" as used herein refers to refer to a synthetic diesel feedstock produced via a Fischer-Tropsch process and having a 90% distillation temperature of less than about 750° F. (399° C.), for example less than about 700° F. (371° C.). In embodiments, the Fischer-Tropsch feed has a 90% distillation temperature in the range of about 550° F. (288° C.) to about 750° F. (399° C.), for example about 550° F. (288° C.) to about 700° F. (371° C.), or about 600° F. (316° C.) to about 700° F. (371° C.). The 90% distillation temperature may be determined in accordance with ASTM D 2887. In embodiments, the Fischer-Tropsch feed has a 5% distillation temperature in the range of about 250° F. (121° C.) to about 600° F. (316° C.), for example about 300° F. (149° C.) to about 600° F. (316° C.), or about 340° F. (171° C.) to about 600° F. (316° C.), or about 340° F. (171° C.) to about 500° F. (260° C.), or about 340° F. (171° C.) to about 400° F. (204° C.). The 5% distillation temperature may be determined in accordance with ASTM D 2887. In embodiments, the Fischer-Tropsch feed has a 90% distillation temperature in the range of about 550° F. (288° C.) to about 750° F. (399° C.) and a 5% distillation temperature in the range of about 250° F. (121° C.) to about 600° F. (316° C.). In embodiments, the Fischer-Tropsch feed has a 90% distillation temperature in the range of about 550° F. (288° C.) to about 700° F. (371° C.) and a 5% distillation temperature in the range of about 300° F. (149° C.) to about 600° F. (316° C.). In embodiments, the Fischer-Tropsch feed has a 90% distillation temperature in the range of about 600° F. (316° C.) to about 700° F. (371° C.) and a 5% distillation temperature in the range of about 340° F. (171° C.) to about 600° F. (316° C.). In embodiments, the Fischer-Tropsch feed has a 90% distillation temperature in the range of about 600° F. (316° C.) to about 700° F. (371° C.) and a 5% distillation temperature in the range of about 340° F. (171° C.) to about 500° F. (260° C.). In embodiments, the Fischer-Tropsch feed has a 90% distillation temperature in the range of about 600° F. (316° C.) to about 700° F. (371° C.) and a 5% distillation temperature in the range of about 340° F. (171° C.) to about 400° F. (204° C.). In embodiments, a "Fischer-Tropsch feed" may have boiling points in the range of about 250° F. (121° C.) to about 900° F. (482° C.), for example about 250° F. (121° C.) to about 800° F. (427° C.) at atmospheric pressure.

The term "diesel fuel" is used herein to refer to a hydrocarbon product having boiling points in the range of about 300° F. to about 800° F. (about 149° C. to about 427° C.) at atmospheric pressure.

The term "active source" means a reagent or precursor material capable of supplying at least one element in a form that can react and which can be incorporated into the molecular sieve structure. The terms "source" and "active source" can be used interchangeably herein.

The term "molecular sieve" and "zeolite" are synonymous and include (a) intermediate and (b) final or target molecular sieves and molecular sieves produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004.

The terms "*MRE-type molecular sieve", "EUO-type molecular sieve" and "MTT-type molecular sieve" includes all molecular sieves and their isotypes that have been assigned the International Zeolite Association framework, as described in the *Atlas of Zeolite Framework Types*, eds. Ch. Baerlocher, L. B. McCusker and D. H. Olson, Elsevier, 6$^{th}$ revised edition, 2007 and the Database of Zeolite Structures on the International Zeolite Association's website (http://www.iza-online.org).

$SiO_2/Al_2O_3$ Ratio (SAR): determined by ICP elemental analysis. A SAR of infinity (∞) represents the case where there is no aluminum in the zeolite, i.e., the mole ratio of silica to alumina is infinity. In that case, the molecular sieve is comprised essentially of silica.

As used herein, the term "pour point" refers to the temperature at which an oil will begin to flow under controlled conditions. The pour point may be determined by ASTM D5950.

As used herein, "cloud point" refers to the temperature at which a sample begins to develop a haze as the oil is cooled under specified conditions. Cloud point may be determined by ASTM D5773.

"Group 2, 8, 9 and 10 metals" refers to elemental metal(s) selected from Groups 2, 8, 9 and 10 of the Periodic Table of the Elements and/or to metal compounds comprising such metal(s). "Group 6 metals" refers to elemental metal(s) selected from Group 6 of the Periodic Table of the Elements and/or to metal compounds comprising such metal(s).

The term "Periodic Table" refers to the version of IUPAC Periodic Table of the Elements dated 1 Dec. 2018.

Unless otherwise specified, the "feed rate" of a hydrocarbon feedstock being fed to a catalytic reaction zone is expressed herein as the volume of feed per volume of catalyst per hour, which may be referred to as liquid hourly space velocity (LHSV) with units of reciprocal hours ($h^{-1}$).

The term "hydrotreating" refers to processes or steps performed in the presence of hydrogen for the hydrodesulfurization, hydrodenitrogenation, hydrodemetallation, and/or hydrodearomatization of components (e.g., impurities) of a diesel feedstock, and/or for the hydrogenation of unsaturated compounds in the feedstock.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

In addition, all number ranges presented herein are inclusive of their upper and lower limit values.

If a standard test is mentioned herein, unless otherwise stated, the version of the test to be referred to is the most recent at the time of filing this patent application.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

Diesel Feedstocks

Diesel feedstocks described herein comprise or are a biocomponent feed or a Fischer-Tropsch feed. In embodiments, the diesel feedstock comprises, consists essentially of or consists of a biocomponent feed. In embodiments, the biocomponent feed constitutes at least about 5 wt. % of the diesel feedstock, for example, at least about 10 wt. %, at least about 20 wt. %, at least about 30 wt. %, at least about 40 wt. %, at least about 50 wt. %, at least about 60 wt. %, at least about 70 wt. %, at least about 80 wt. %, at least about 90 wt. %, at least about 95 wt. %, at least about 98 wt. %, or at least about 99 wt. % of the diesel feedstock. In embodiments, the biocomponent feed constitutes 5 wt. % to 100 wt. % of the diesel feedstock, for example 10 wt. % to 100 wt. %, 50 wt. % to 100 wt. %, 80 wt. % to 100 wt. %, 95 wt. % to 100 wt. % of the diesel feedstock. In embodiments, the diesel feedstock comprises, consists essentially of or consists of a Fischer-Tropsch feed. In embodiments, the Fischer-Tropsch feed constitutes at least about 5 wt. % of the diesel feedstock, for example, at least about 10 wt. %, at least about 20 wt. %, at least about 30 wt. %, at least about 40 wt. %, at least about 50 wt. %, at least about 60 wt. %, at least about 70 wt. %, at least about 80 wt. %, at least about 90 wt. %, at least about 95 wt. %, at least about 98 wt. %, or at least about 99 wt. % of the diesel feedstock. In embodiments, the Fischer-Tropsch feed constitutes 5 wt. % to 100 wt. % of the diesel feedstock, for example 10 wt. % to 100 wt. %, 50 wt. % to 100 wt. %, 80 wt. % to 100 wt. %, 95 wt. % to 100 wt. % of the diesel feedstock.

In embodiments, the diesel feedstock is a blended diesel feedstock comprising a biocomponent feed or a Fischer-Tropsch feed in combination with another diesel feedstock such as a blend feed described as follows. For example, the blended diesel feedstock may comprise a blend feed selected from gas oils, vacuum gas oils, long residues, vacuum residues, atmospheric distillates, heavy fuels, oils, waxes and paraffins, used oils, deasphalted residues or crudes, charges resulting from thermal or catalytic conversion processes, or a combination thereof. In embodiments, the blend feed is selected from whole crude petroleum, reduced crudes, vacuum tower residua, cycle oils, synthetic crudes, gas oils, vacuum gas oils, foots oils, Fischer-Tropsch derived waxes, lubricating oil stocks, heating oils, heavy neutral feeds, hydrotreated gas oils, hydrocracked gas oils, hydrotreated lubricating oil raffinates, brightstocks, lubricating oil stocks, synthetic oils, high pour point polyolefins (for example, polyolefins having a pour point of about 0° C. or above); normal alphaolefin waxes, slack waxes, deoiled waxes, microcrystalline waxes, residuum fractions from atmospheric pressure distillation processes, solvent-deasphalted petroleum residua, shale oils, cycle oils, petroleum wax, slack wax, and waxes produced in chemical plant processes. In embodiments, the diesel feedstock is a blended diesel feedstock comprising a biocomponent feed and a Fischer-Tropsch feed. In embodiments, the diesel feedstock is a blended diesel feedstock comprising a biocomponent feed, a Fischer-Tropsch feed and a blend feed (for example, a blend feed as described above).

In embodiments, the diesel feedstock is a blended diesel feedstock comprising a biocomponent feed and a blend feed, where the blended diesel feedstock comprises at least about 5 wt. % of the biocomponent feed and up to about 95 wt. % of a blend feed, for example, at least about 10 wt. % of the biocomponent feed and up to about 90 wt. % of a blend feed, at least about 50 wt. % of the biocomponent feed and up to about 50 wt. % of a blend feed, at least about 80 wt. % of the biocomponent feed and up to about 20 wt. % of a blend feed, or at least about 95 wt. % of the biocomponent feed and up to about 5 wt. % of a blend feed.

In embodiments, the diesel feedstock is a blended diesel feedstock comprising a Fischer-Tropsch feed in combination with a blend feed, where the blended diesel feedstock comprises at least about 5 wt. % of the Fischer-Tropsch feed and up to about 95 wt. % of a blend feed, for example at least about 10 wt. % of the Fischer-Tropsch feed and up to about 90 wt. % of a blend feed, at least about 50 wt. % of the Fischer-Tropsch feed and up to about 50 wt. % of a blend feed, at least about 80 wt. % of the Fischer-Tropsch feed and up to about 20 wt. % of a blend feed, or at least about 95 wt. % of the Fischer-Tropsch feed and up to about 5 wt. % of a blend feed.

Biocomponent Feed

In embodiments, the diesel feedstock comprises, consists essentially of or consists of a biocomponent feed. Plant-based oils and fats include vegetable oils and fats, such as rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil, and rice bran oil. Animal oils and fats include beef fat (tallow), hog fat (lard), turkey fat, fish fat/oil, and chicken fat), including algae and fish fats/oils. In embodiments, the biocomponent feed is selected from vegetable oils and animal fats comprising, or consisting essentially of, triglycerides and free fatty adds (FFA).

In embodiments, the triglycerides and FFAs contain aliphatic hydrocarbon chains in their structure having 6-24 carbon atoms (for example, 8 to 24, 8 to 20, or 10-16 carbon atoms). In embodiments, the biocomponent feed comprises triglycerides having the general formula (1):

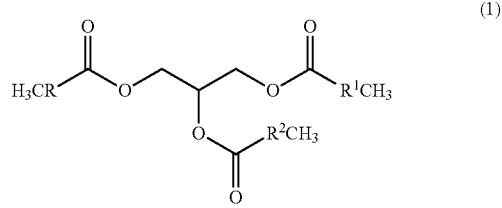

where R, $R^1$ and $R^2$ are independently aliphatic hydrocarbon chains having from 6-24 carbon atoms (for example, 8 to 24, 8 to 20, 10-20, 10-18, or 10-16 carbon atoms). In embodiments, R, $R^1$ and $R^2$ are independently branched or un-branched, substituted or unsubstituted, completely saturated or contain one or more (for example 1-4, 1-3 or 1 or 2) unsaturated carbon-carbon bonds. In embodiments, R, $R^1$ and $R^2$ are unsubstituted. In embodiments, R, $R^1$ and $R^2$ are independently completely saturated or contain one or more (for example 1-4, 1-3 or 1 or 2) unsaturated carbon-carbon bonds. In embodiments, R, $R^1$ and $R^2$ are un-branched.

In embodiments, the biocomponent feed comprises free fatty acids (FFAs) having aliphatic hydrocarbon tails of 6 to 24 carbon atoms, for example 8 to 24 carbon atoms, 8 to 20 carbon atoms, 10 to 20 carbon atoms, 10 to 18 carbon atoms, or 10-16 carbon atoms. In embodiments, the FFAs comprise unsaturated or saturated aliphatic hydrocarbon tails. In embodiments, the FFAs comprise unbranched or branched aliphatic hydrocarbon tails.

In embodiments, the biocomponent feed is selected from canola oil, corn oil, soy oils, castor oil, camelina oil, palm oil and combinations thereof.

In embodiments, the biocomponent feed has an oxygenate content of at least about 0.5 wt. % by total weight of the biocomponent feed, for example, at least about 1.0 wt. %, at least about 2.0 wt. %, at least about 3.0 wt. %, at least about 4.0 wt. %, or at least about 5.0 wt. % by total weight of the biocomponent feed. In embodiments, the biocomponent feed has an oxygenate content of up to about 15 wt. % by total weight of the biocomponent feed, for example up to about 10 wt. % by total weight of the biocomponent feed, or up to about 5 wt. % by total weight of the biocomponent feed. In embodiments, the biocomponent feed has an oxygenate content in the range of about 1-15 wt. % by total weight of the biocomponent feed, for example, in the range of about 5-15 wt. %, or about 10-15 wt. %, by total weight of the biocomponent feed. The oxygenate content of the biocomponent feed may be measured by neutron activation analysis, for example, in accordance with ASTM E385-90 (2002).

In embodiments, the biocomponent feed is hydrotreated prior to being contacted with the hydroisomerisation catalyst. In embodiments, the biocomponent feed has a sulfur (S) content of less than about 200 ppm, for example less than about 100 ppm, less than about 50 ppm or less than about 20 ppm. In embodiments, the biocomponent feed has a nitrogen (N) content of less than about 50 ppm, for example less than about 20 ppm, or less than about 10 ppm. In embodiments, the hydrotreated biocomponent feed has an oxygenate content that is typically about 0 wt. %, or, alternatively, of less than about 2 wt. %, or 5 wt. %. The nitrogen content of the biocomponent feed may be determined in accordance with ASTM D4629. The sulfur content of the biocomponent feed may be determined in accordance with ASTM D2622.

Fischer-Tropsch Feed

In embodiments, the diesel feedstock comprises, consists essentially of or consists of a Fischer-Tropsch feed. The Fischer-Tropsch feed will typically have a paraffin content of at least about 90 wt. %, for example, at least about 95 wt. %, or at least about 97.5 wt. %. The Fischer-Tropsch feed typically comprises only very minor amounts of olefins and cycloparaffins, for example, less than about 1.0 wt. % olefin, or less than about 0.5 wt. % olefin, and/or less than about 1.0 wt. % cycloparaffin, less than about 0.5 wt. % cycloparaffin, or less than about 0.1 wt. % cycloparaffin. In embodiments, the Fischer-Tropsch feed has a S content of less than about 50 ppm, for example less than about 20 ppm. In embodiments, the Fischer-Tropsch feed has a N content of less than about 50 ppm, for example less than about 20 ppm. In embodiments, the Fischer-Tropsch feed has a metal content of less than about 10 ppm, for example less than about 5 ppm. The paraffin content and cylcoparaffin content of the Fischer-Tropsch feed may be determined by GC-FIMS analysis as described in "Diesel Fuel Analysis by GC-FIMS: Normal Paraffins, Isoparaffins and Cycloparaffins", Briker, Y., et al., Energy Fuels 2001, 15, 4, 996-1002. The nitrogen content of the Fischer-Tropsch feed may be determined in accordance with ASTM D3228-20. The sulfur content of the Fischer-Tropsch feed may be determined in accordance with ASTM D4629. The metal content of the Fischer-Tropsch feed may be measured by inductively coupled plasma atomic emission spectroscopy (ICP-AES).

Hydroisomerisation Catalyst

The term "hydroisomerisation catalyst" is used herein refers to a hydroisomerisation catalyst comprising zeolite SSZ-91, zeolite SSZ-32, zeolite SSZ-32x, or combinations thereof, as described below.

In embodiments, the hydroisomerisation catalyst comprises from about 5 to about 95 wt. % zeolite SSZ-91, zeolite SSZ-32 or zeolite SSZ-32x by total weight of the hydroisomerisation catalyst, for example from about 10 to about 95 wt. % zeolite SSZ-91, zeolite SSZ-32 or zeolite SSZ-32x, from about 20 to about 90 wt. % zeolite SSZ-91, zeolite SSZ-32 or zeolite SSZ-32x, from about 25 to about 85 wt. % zeolite SSZ-91, zeolite SSZ-32 or zeolite SSZ-32x, from about 30 to about 80 wt. % zeolite SSZ-91, zeolite SSZ-32 or zeolite SSZ-32x, or from about 35 to about 75 wt. % zeolite SSZ-91, zeolite SSZ-32 or zeolite SSZ-32x, or from about 35 to about 65 wt. % zeolite SSZ-91, zeolite SSZ-32 or zeolite SSZ-32x, or from about 35 to about 55 wt. % zeolite SSZ-91, zeolite SSZ-32 or zeolite SSZ-32x, or from about 45 to about 75 wt. % zeolite SSZ-91, zeolite SSZ-32 or zeolite SSZ-32x, or from about 55 to about 75 wt. % zeolite SSZ-91, zeolite SSZ-32 or zeolite SSZ-32x by total weight of the hydroisomerisation catalyst.

The hydroisomerisation catalyst further comprises a metal modifier, for example a metal modifier selected from Group 2, 8, 9 and 10 metals or combinations thereof. In embodiments, the metal modifier is selected from Group 8, 9 or 10 metals and combinations thereof, for example the metal modifier may be selected from Fe, Co, Ni, Ru, Rh, Pd, Os, Ir, Pt and combinations thereof. In embodiments, the metal modifier is selected from Group 10 metals and combinations thereof. In embodiments, the hydroisomerisation catalyst comprises platinum.

In embodiments, the hydroisomerisation catalyst comprises from about 0.05 to about 2.0 wt. % of a metal modifier (e.g., selected from Group 2, 8, 9 and 10 metals, or a Group 8, 9 or 10 metal, for example a Group 10 metal such as platinum) by total weight of the hydroisomerisation catalyst, for example, about 0.1 to about 1.5 wt. %, or about 0.2 to about 1.5 wt. %, or about 0.1 to about 1 wt. %, by total weight of the hydroisomerisation catalyst.

In embodiments, the hydroisomerisation catalyst comprises an oxide binder. In embodiments, the oxide binder is an inorganic oxide. In embodiments, the hydroisomerisation catalyst comprises an oxide binder selected from alumina, silica, ceria, titania, tungsten oxide, zirconia and combinations thereof. In embodiments, the hydroisomerisation catalyst comprises an oxide binder comprising alumina. Suitable aluminas are commercially available, including, e.g., Catapal® aluminas and Pural® aluminas from Sasol® or Versal® aluminas from UOP®. In general, the alumina can be any alumina known for use as a matrix material in a catalyst base. For example, the alumina can be boehmite, bayerite, γ-alumina, η-alumina, θ-alumina, δ-alumina, χ-alumina, or a mixture thereof. In embodiments, the hydroisomerisation catalyst comprises from about 5 to about 95 wt. % oxide binder by total weight of the hydroisomerisation catalyst, for example about 5 to about 80 wt. % oxide binder, about 10 to about 70 wt. % oxide binder a, about 20 to about 70 wt.

% oxide binder, for example about 25 to about 65 wt. % oxide binder by total weight of the hydroisomerisation catalyst.

In embodiments, the hydroisomerisation catalyst comprises:
from about 5 to about 95 wt. % zeolite SSZ-91, zeolite SSZ-32 or zeolite SSZ-32x;
from about 0.05 to about 2.0 wt. % of a Group 8-10 metal; and
from about 5 to about 95 wt. % oxide binder by total weight of the hydroisomerisation catalyst.

In embodiments, the hydroisomerisation catalyst comprises:
from about 30 to about 80 wt. % zeolite SSZ-91, zeolite SSZ-32 or zeolite SSZ-32x;
from about 0.1 to about 1.5 wt. % of a Group 8-10 metal; and
from about 20 to about 70 wt. % oxide binder by total weight of the hydroisomerisation catalyst.

Zeolite SSZ-91

Zeolite SSZ-91 and methods for making Zeolite SSZ-91 are described in U.S. Pat. No. 9,920,260 which is incorporated herein by reference in its entirety. Zeolite SSZ-91 may also be referred to as SSZ-91 molecular sieve.

Zeolite SSZ-91 has a $SiO_2/Al_2O_3$ mole ratio (SAR) of 40 to 220. In embodiments, zeolite SSZ-91 has a $SiO_2/Al_2O_3$ mole ratio (SAR) of 40 to 200, for example, 70 to 200, 80 to 200, 70 to 180, 80 to 180, 70 to 160, 80 to 160, 70 to 140, 80 to 140, 100 to 160, 100 to 140, or 120 to 140. The SAR is determined by inductively coupled plasma (ICP) elemental analysis.

Zeolite SSZ-91 is composed of at least 70% polytype 6 of the total ZSM-48-type material present in the product. The proportion of polytype 6 of the total ZSM-48-type material present in the product is determined by DIFFaX simulation and as described by Lobo and Koningsveld in J. Am. Chem. Soc. 2012, 124, 13222-13230, where the disorder was tuned by three distinct fault probabilities. It should be noted the phrase "at least X %" includes the case where there are no other ZSM-48 polytypes present in the structure, i.e., the material is 100% polytype 6. The structure of polytype 6 is as described by Lobo and Koningsveld. (See, J. Am. Chem. Soc. 2002, 124, 13222-13230). In embodiments, the SSZ-91 material is composed of at least 80% polytype 6 of the total ZSM-48-type material present in the product. In embodiments, the SSZ-91 material is composed of at least 90% polytype 6 of the total ZSM 48-type material present in the product. The polytype 6 structure has been given the framework code *MRE by the Structure Commission of the International Zeolite Association.

Zeolite SSZ-91 has a morphology characterized as polycrystalline aggregates comprising crystallites collectively having an average aspect ratio in the range of 1 to 8. In embodiments, Zeolite SSZ-91 has a morphology characterized as polycrystalline aggregates comprising crystallites collectively having an average aspect ratio in the range of 1 to 6, for example 1 to 5, 1 to 4 or 1 to 3.

In embodiments, zeolite SSZ-91 has a morphology characterized as polycrystalline aggregates having a diameter of between about 100 nm and 1.5 μm, each of the aggregates comprising a collection of crystallites collectively having an average aspect ratio in the range of 1 to 8. In embodiments, zeolite SSZ-91 has a morphology characterized as polycrystalline aggregates having a diameter of between about 100 nm and 1.5 μm, each of the aggregates comprising a collection of crystallites collectively having an average aspect ratio in the range of 1 to 6, for example 1 to 5, 1 to 4 or 1 to 3. As used herein, the term diameter refers to the shortest length on the short end of each crystallite examined.

Zeolite SSZ-91 is a substantially phase pure material. As used herein, the term "substantially phase pure material" means the material is completely free of zeolite phases other than those belonging to the ZSM-48 family of zeolites, or are present in quantities that have less than a measurable effect on, or confer less than a material disadvantage to, the selectivity of the material. Two common phases that co-crystalize with SSZ-91 are EUO-type molecular sieves such as EU-1, as well as Magadiite and Kenyaite. These additional phases may be present as separate phases, or may be intergrown with the SSZ-91 phase.

In embodiments, zeolite SSZ-91 comprises an EUO-type molecular sieve phase in an amount in the range of 0 to 7 wt. % by weight of the total zeolite SSZ-91 product. In embodiments, zeolite SSZ-91 comprises an EUO-type molecular sieve phase in an amount in the range of 0 to 5.0 wt. %, for example, 0 to 4.0 wt. %, or 0 to 3.5 wt. %. In embodiments, zeolite SSZ-91 comprises an EUO-type molecular sieve phase in an amount in the range of 0.1 to 7.0 wt. %, for example, 0.1 to 5.0 wt. %, 0.1 to 4.0 wt. %, or 0.1 to 3.5 wt. %. In embodiments, zeolite SSZ-91 comprises 0 to 7 wt. % EU-1, for example 0 to 5.0 wt. % EU-1, 0 to 4.0 wt. % EU-1, 0 to 3.5 wt. % EU-1, 0.1 to 7.0 wt. % EU-1, 0.1 to 5.0 wt. % EU-1, 0.1 to 4.0 wt. % EU-1, 0.1 to 3.5 wt. % EU-1, 0.1 to 2 wt. % EU-1, or 0.1 to 1 wt. % EU-1.

It is known that the ratio of powder XRD peak intensities varies linearly as a function of weight fractions for any two phases in a mixture: $(|\alpha|/|\beta|)=(RIR\alpha/RIR\beta)*(x\alpha/x\beta)$, where the RIR (Reference Intensity Ratio) parameters can be found in The International Centre for Diffraction Data's Powder Diffraction File (PDF) database (http://www.icdd.com/products/). The weight percentage of the EUO phase in zeolite SSZ-91 may therefore calculated by measuring the ratio between the peak intensity of the EUO phase and that of the SSZ-91 phase.

In embodiments, zeolite SSZ-91 comprises:
a silicon oxide ($SiO_2$) to aluminum oxide ($Al_2O_3$) mole ratio (SAR) of 40 to 220;
at least 70% polytype 6 of the total ZSM-48-type material;
0 to 7.0 wt. % of an EUO-type molecular sieve phase;
wherein the zeolite SSZ-91 has a morphology characterized as polycrystalline aggregates comprising crystallites collectively having an average aspect ratio of between 1 and 8.

In embodiments, zeolite SSZ-91 comprises:
a silicon oxide ($SiO_2$) to aluminum oxide ($Al_2O_3$) mole ratio (SAR) of 40 to 220;
at least 70% polytype 6 of the total ZSM-48-type material;
0 to 4.0 wt. % of an EUO-type molecular sieve phase;
wherein the zeolite SSZ-91 has a morphology characterized as polycrystalline aggregates comprising crystallites collectively having an average aspect ratio of between 1 and 8.

In embodiments, zeolite SSZ-91 comprises:
a silicon oxide ($SiO_2$) to aluminum oxide ($Al_2O_3$) mole ratio (SAR) of 40 to 220;
at least 70% polytype 6 of the total ZSM-48-type material;
0 to 3.5 wt. % of an EUO-type molecular sieve phase;
wherein the zeolite SSZ-91 has a morphology characterized as polycrystalline aggregates comprising crystallites collectively having an average aspect ratio of between 1 and 8.

In embodiments, zeolite SSZ-91 comprises:
a silicon oxide ($SiO_2$) to aluminum oxide ($Al_2O_3$) mole ratio (SAR) of 40 to 200;
at least 70% polytype 6 of the total ZSM-48-type material;
0 to 4.0 wt. % of an EUO-type molecular sieve phase;
wherein the zeolite SSZ-91 has a morphology characterized as polycrystalline aggregates comprising crystallites collectively having an average aspect ratio of between 1 and 8.

In embodiments, zeolite SSZ-91 comprises:
a silicon oxide ($SiO_2$) to aluminum oxide ($Al_2O_3$) mole ratio (SAR) of 70 to 200;
at least 70% polytype 6 of the total ZSM-48-type material;
0 to 4.0 wt. % of an EUO-type molecular sieve phase;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 80 to 200;
at least 70% polytype 6 of the total ZSM-48-type material;
0.1 to 7.0 wt. % of an EUO-type molecular sieve phase;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 80 to 200;
at least 70% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 80 to 200;
at least 70% polytype 6 of the total ZSM-48-type material;
0.1 to 4.0 wt. % EU-1;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 80 to 200;
at least 70% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 80 to 160;
at least 70% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 70 to 160;
at least 70% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 70 to 200;
at least 80% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 80 to 200;
at least 80% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 6.

In embodiments, zeolite SSZ-91 comprises:
a silicon oxide ($SiO_2$) to aluminum oxide ($Al_2O_3$) mole ratio (SAR) of 80 to 200;
at least 80% polytype 6 of the total ZSM-48-type material;
0.1 to 7.0 wt. % of an EUO-type molecular sieve phase;
wherein the zeolite SSZ-91 has a morphology characterized as polycrystalline aggregates comprising crystallites collectively having an average aspect ratio of between 1 and 4.

In embodiments, zeolite SSZ-91 comprises:
a silicon oxide ($SiO_2$) to aluminum oxide ($Al_2O_3$) mole ratio (SAR) of 80 to 200;
at least 80% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 4.

In embodiments, zeolite SSZ-91 comprises:
a silicon oxide ($SiO_2$) to aluminum oxide ($Al_2O_3$) mole ratio (SAR) of 80 to 160;
at least 80% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 4.

In embodiments, zeolite SSZ-91 comprises:
a silicon oxide ($SiO_2$) to aluminum oxide ($Al_2O_3$) mole ratio (SAR) of 100 to 140;
at least 80% polytype 6 of the total ZSM-48-type material;
0.1 to 4.0 wt. % of an EUO-type molecular sieve phase;
wherein the zeolite SSZ-91 has a morphology characterized as polycrystalline aggregates comprising crystallites collectively having an average aspect ratio of between 1 and 4.

In embodiments, zeolite SSZ-91 comprises:
a silicon oxide (SiO$_2$) to aluminum oxide (Al$_2$O$_3$) mole ratio (SAR) of 100 to 140;
at least 80% polytype 6 of the total ZSM-48-type material;
0.1 to 4.0 wt. % of EU-1;
wherein the zeolite SSZ-91 has a morphology characterized as polycrystalline aggregates comprising crystallites collectively having an average aspect ratio of between 1 and 4.

Zeolite SSZ-91 synthesized as described herein can be characterized by their XRD pattern. The powder XRD lines of Table 1 are representative of as-synthesized zeolite SSZ-91. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/Al mole ratio from sample to sample. Calcination can also cause minor shifts in the XRD pattern. Notwithstanding these minor perturbations, the basic crystal lattice structure remains unchanged.

TABLE 1

Characteristic Peaks for As-Synthesized SSZ-91

| 2-Theta$^{(a)}$ | d-spacing (nm) | Relative Intensity$^{(b)}$ |
|---|---|---|
| 7.55 | 1.170 | W |
| 8.71 | 1.015 | W |
| 12.49 | 0.708 | W |
| 15.12 | 0.586 | W |
| 21.18 | 0.419 | VS |
| 22.82 | 0.390 | VS |
| 24.62 | 0.361 | W |
| 26.39 | 0.337 | W |
| 29.03 | 0.307 | W |
| 31.33 | 0.285 | W |

$^{(a)}$±0.20
$^{(b)}$The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The X-ray diffraction pattern lines of Table 2 are representative of calcined SSZ-91.

TABLE 2

Characteristic Peaks for Calcined SSZ-91

| 2-Theta$^{(a)}$ | d-spacing (nm) | Relative Intensity$^{(b)}$ |
|---|---|---|
| 7.67 | 1.152 | M |
| 8.81 | 1.003 | W |
| 12.61 | 0.701 | W |
| 15.30 | 0.579 | W |
| 21.25 | 0.418 | VS |
| 23.02 | 0.386 | VS |
| 24.91 | 0.357 | W |
| 26.63 | 0.334 | W |
| 29.20 | 0.306 | W |
| 31.51 | 0.284 | W |

$^{(a)}$±0.20
$^{(b)}$The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuK$_\alpha$ radiation. The peak heights and the positions, as a function of 2θ where θ is the Bragg angle, were read from the relative intensities of the peaks (adjusting for background), and d, the interplanar spacing corresponding to the recorded lines, can be calculated.

Preparation of Zeolite SSZ-91
Reaction Mixture and Crystallization

In preparing zeolite SSZ-91, at least one organic compound selective for synthesizing molecular sieves from the ZSM-48 family of zeolites is used as a structure directing agent ("SDA"), also known as a crystallization template. The SDA useful for making zeolite SSZ-91 is represented by the following structure (1):

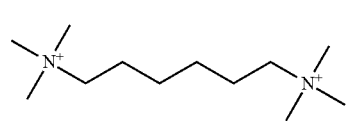

(1)

N,N,N,N',N',N'-Hexamethylhexamethylenediammonium or Hexamethonium Cation

The SDA cation is typically associated with anions which may be any anion that is not detrimental to the formation of the molecular sieve. Representative examples of anions include hydroxide, acetate, sulfate, carboxylate and halogens, for example, fluoride, chloride, bromide and iodide. In one embodiment, the anion is bromide.

In general, zeolite SSZ-91 is prepared by:
(a) preparing a reaction mixture containing (1) at least one source of silicon oxide; (2) at least one source of aluminum oxide; (3) at least one source of an element selected from Groups 1 and 2 of the Periodic Table; (4) hydroxide ions; (5) hexamethonium cations; and (6) water; and
(b) maintaining the reaction mixture under crystallization conditions sufficient to form crystals of the molecular sieve.

The composition of the reaction mixture from which the zeolite SSZ-91 is formed, in terms of mole ratios, is identified below:

| Components | Mole Ratio |
|---|---|
| SiO$_2$/Al$_2$O$_3$ | 50-220 |
| M/SiO$_2$ | 0.05-1.0 |
| Q/SiO$_2$ | 0.01-0.2 |
| OH/SiO$_2$ | 0.05-0.4 |
| H$_2$O/SiO$_2$ | 3-100 | wherein, M is selected from the group consisting of elements from Groups 1 and 2 of the Periodic Table; and Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| SiO$_2$/Al$_2$O$_3$ | 85-180 |
| M/SiO$_2$ | 0.1-0.8 |
| Q/SiO$_2$ | 0.02-0.1 |
| OH/SiO$_2$ | 0.10-0.3 |
| H$_2$O/SiO$_2$ | 10-50 | wherein, M is selected from the group consisting of elements from Groups 1 and 2 of the Periodic Table; and Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 50-220 |
| $M/SiO_2$ | 0.05-1.0 |
| $O/SiO_2$ | 0.01-0.2 |
| $OH/SiO_2$ | 0.05-0.4 |
| $H_2O/SiO_2$ | 3-100 | wherein, M is selected from the group consisting of elements from Groups 1 and 2 of the Periodic Table; and Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 50-220 |
| $M/SiO_2$ | 0.05-1.0 |
| $Q/SiO_2$ | 0.02-0.1 |
| $OH/SiO_2$ | 0.05-0.4 |
| $H_2O/SiO_2$ | 3-100 | wherein, M is selected from the group consisting of elements from Groups 1 and 2 of the Periodic Table; and Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 80-180 |
| $M/SiO_2$ | 0.05-1.0 |
| $Q/SiO_2$ | 0.02-0.1 |
| $OH/SiO_2$ | 0.05-0.4 |
| $H_2O/SiO_2$ | 3-100 | wherein, M is selected from the group consisting of elements from Groups 1 and 2 of the Periodic Table; and Q is the structure directing agent represented by structure 1 above.

In embodiments, the composition of the reaction mixture from which the zeolite SSZ-91 is formed, in terms of mole ratios, is identified below:

| Components | Mole Ratio |
|---|---|
| $SiO_2/Al_2O_3$ | 80-160 |
| $M/SiO_2$ | 0.05-1.0 |
| $Q/SiO_2$ | 0.02-0.1 |
| $OH/SiO_2$ | 0.1-0.4 |
| $H_2O/SiO_2$ | 3-100 | wherein, M is selected from the group consisting of elements from Groups 1 and 2 of the Periodic Table; and Q is the structure directing agent represented by structure 1 above.

Sources useful herein for silicon include fumed silica, precipitated silica, silica hydrogel, silicic acid, colloidal silica, tetra-alkyl orthosilicates (e.g., tetraethyl orthosilicate), and silica hydroxides.

The reaction mixture can be formed containing at least one source of an elements selected from Groups 1 and 2 of the Periodic Table (referred to herein as M). In embodiments, the reaction mixture is formed using a source of an element from Group 1 of the Periodic Table. In embodiments, the reaction mixture is formed using a source of sodium (Na). Any M-containing compound which is not detrimental to the crystallization process is suitable. Sources for such Groups 1 and 2 elements include oxide, hydroxides, nitrates, sulfates, halides, oxalates, citrates and acetates thereof.

For each embodiment described herein, the molecular sieve reaction mixture can be supplied by more than one source. Also, two or more reaction components can be provided by one source.

The reaction mixture is maintained at an elevated temperature until the crystals of the molecular sieve are formed. Zeolite hydrothermal crystallization is usually conducted under pressure, and usually in an autoclave so that the reaction mixture is subject to autogenous pressure and optionally stirring, at a temperature in the range of about 125° C. to about 200° C., for a suitable period, for example for about an hour to a few days, for example, from about 1 hour to about 10 days, from about 1 hour to about 9 days, from about 1 hour to about 8 days, from about 1 hour to about 7 days, or from about 1 hour to about 6 days, or from about 1 hour to about 5 days, or from about 1 hour to about 4 days, or from about 1 hour to about 3 days, or from about 1 hour to about 48 hours, or from about 1 hour to about 36 hours, or from about 1 hour to about 24 hours, or from about 1 hour to about 18 hours.

In embodiments, the zeolite SSZ-91 is prepared by a method comprising preparing a reaction mixture containing at least one source of silicon, at least one source of aluminum, at least one source of an element selected from Groups 1 and 2 of the Period Table, hydroxide ions, hexamethonium cations, and water; and subjecting the reaction mixture to crystallization conditions; wherein the reaction mixture comprises:

| Components | Mole Ratio |
|---|---|
| $SiO_2/Al_2O_3$ | 50-220 |
| $M/SiO_2$ | 0.05-1.0 |
| $Q/SiO_2$ | 0.01-0.2 |
| $OH/SiO_2$ | 0.05-0.4 |
| $H_2O/SiO_2$ | 3-100 | wherein M is selected from the group consisting of elements from Groups 1 and 2 of the Period Table; Q is a hexamethonium cation, and wherein the crystallisation conditions include maintaining the reaction mixture at an elevated temperature in the range of about 125° C. to about 200° C.

In embodiments, the zeolite SSZ-91 is prepared by a method comprising preparing a reaction mixture containing at least one source of silicon, at least one source of aluminum, at least one source of an element selected from Groups 1 and 2 of the Period Table, hydroxide ions, hexamethonium cations, and water; and subjecting the reaction mixture to crystallization conditions; wherein the reaction mixture comprises:

| Components | Mole Ratio |
| --- | --- |
| $SiO_2/Al_2O_3$ | 50-220 |
| $M/SiO_2$ | 0.05-1.0 |
| $Q/SiO_2$ | 0.02-0.1 |
| $OH/SiO_2$ | 0.05-0.4 |
| $H_2O/SiO_2$ | 3-100 | wherein M is selected from the group consisting of elements from Groups 1 and 2 of the Period Table; Q is a hexamethonium cation, and wherein the crystallisation conditions include maintaining the reaction mixture at an elevated temperature in the range of about 125° C. to about 200° C., for example about 125° C. to about 180° C., or about 125° C. to about 160° C.

In embodiments, the zeolite SSZ-91 is prepared by a method comprising preparing a reaction mixture containing at least one source of silicon, at least one source of aluminum, at least one source of an element selected from Groups 1 and 2 of the Period Table, hydroxide ions, hexamethonium cations, and water; and subjecting the reaction mixture to crystallization conditions; wherein the reaction mixture comprises:

| Components | Mole Ratio |
| --- | --- |
| $SiO_2/Al_2O_3$ | 80-180 |
| $M/SiO_2$ | 0.05-1.0 |
| $Q/SiO_2$ | 0.05-0.2 |
| $OH/SiO_2$ | 0.05-0.4 |
| $H_2O/SiO_2$ | 3-100 | wherein M is selected from the group consisting of elements from Groups 1 and 2 of the Period Table; Q is a hexamethonium cation, and wherein the crystallisation conditions include maintaining the reaction mixture at an elevated temperature in the range of about 125° C. to about 200° C., for example about 125° C. to about 180° C., or about 125° C. to about 160° C.

In embodiments, the zeolite SSZ-91 is prepared by a method comprising preparing a reaction mixture containing at least one source of silicon, at least one source of aluminum, at least one source of an element selected from Groups 1 and 2 of the Period Table, hydroxide ions, hexamethonium cations, and water; and subjecting the reaction mixture to crystallization conditions; wherein the reaction mixture comprises:

| Components | Mole Ratio |
| --- | --- |
| $SiO_2/Al_2O_3$ | 80-160 |
| $M/SiO_2$ | 0.05-1.0 |
| $Q/SiO_2$ | 0.02-0.1 |
| $OH/SiO_2$ | 0.1-0.4 |
| $H_2O/SiO_2$ | 3-100 | wherein M is selected from the group consisting of elements from Groups 1 and 2 of the Period Table; Q is a hexamethonium cation, and wherein the crystallisation conditions include maintaining the reaction mixture at an elevated temperature in the range of about 125° C. to about 200° C., for example about 125° C. to about 180° C., or about 125° C. to about 160° C.

In embodiments, the crystallisation conditions include maintaining the reaction mixture at an elevated temperature in the range of about 125° C. to about 200° C., for example about 125° C. to about 180° C., about 125° C. to about 180° C., about 125° C. to about 170° C., about 125° C. to about 160° C.

The formation of amounts of the EUO phase is suppressed by selecting hydrogel composition, temperature and crystallization time conditions that reduce (or minimize) the formation of the EUO phase while increasing (or maximizing) the SSZ-91 product yield. The Examples provided in U.S. Pat. No. 9,920,260 provide guidance on how changes in these process variables minimize the formation of EU-1. A zeolite manufacturer with ordinary skill in the art will readily be able to select the process variables necessary to minimize the formation of EU-1, as these variables will depend on the size of the production run, the capabilities of the available equipment, desired target yield and acceptable level of EU-1 material in the product.

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. However, it has been found that if seeding is employed, the seeds must be very phase-pure SSZ-91 to avoid the formation of a large amount of a EUO phase. When used as seeds, seed crystals are added in an amount between 0.5% and 5% of the weight of the silicon source used in the reaction mixture.

The formation of Magadiite and Kenyaite is minimized by optimizing the hexamethonium bromide/$SiO_2$ ratio, controlling the hydroxide concentration, and minimizing the concentration of sodium as Magadiite and Kenyaite are layered sodium silicate compositions. The Examples provided in U.S. Pat. No. 9,920,260 provide guidance on how changes in gel conditions minimize the formation of EU-1.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

Post-Crystallization Treatment

Zeolite SSZ-91 can be used as-synthesized, but typically will be thermally treated (calcined). The term "as-synthesized" refers to the zeolite SSZ-91 in its form after crystallization, prior to removal of the SDA cation. The SDA can be removed by thermal treatment (e.g., calcination), for example in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by ozonation and photolysis techniques (e.g., exposing the SDA-containing molecular sieve product to light or electromagnetic radiation that has a wavelength shorter than visible light under conditions sufficient to selectively remove the organic compound from the molecular sieve) as described in U.S. Pat. No. 6,960,327.

Zeolite SSZ-91 can be subsequently calcined in steam, air or inert gas at temperatures ranging from 200° C. to 800° C. for periods of time ranging from 1 hour to a number of days, for example 1 to 48 hours. Usually, it is desirable to remove the extra-framework cation (e.g., Na) by ion exchange and replace it with hydrogen, ammonium, or any desired metal-ion.

Where the molecular sieve formed is an intermediate molecular sieve, the target molecular sieve (e.g., zeolite SSZ-91) can be achieved using post-synthesis techniques such as heteroatom lattice substitution techniques. The target molecular sieve (e.g., zeolite SSZ-91) can also be achieved by removing heteroatoms from the lattice by known techniques such as acid leaching.

Zeolite SSZ-91 made from the process disclosed herein can be formed into a wide variety of physical shapes. Zeolite SSZ-91 can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the zeolite SSZ-91 can be extruded before drying, or, dried or partially dried and then extruded.

Zeolite SSZ-91 can be composited with other materials resistant to the temperatures and other conditions employed in organic conversion processes. Such matrix materials include active and inactive materials and synthetic or naturally occurring molecular sieves as well as inorganic materials such as clays, silica and metal oxides. Examples of such materials and the manner in which they can be used are disclosed in U.S. Pat. Nos. 4,910,006 and 5,316,753.

SSZ-32

SSZ-32 zeolites are described in U.S. Pat. No. 5,397,454 which is incorporated herein by reference in its entirety. SSZ-32 zeolites may also be referred to as MTT framework type molecular sieves.

Zeolite SSZ-32 (also described as SSZ-32 molecular sieves) comprises a silicon oxide ($SiO_2$) to aluminum oxide ($Al_2O_3$) mole ratio (SAR) in the range of 20 to less than 40, for example in the range of 20-39, 20-38, 20-37, 25-39, 25-38, 25-37, 25-35 or 30-35, and a crystal size in the range of about 0.1 to about 0.4 µm. In embodiments, the Zeolite SSZ-32 (also described as SSZ-32 molecular sieves) comprises a silicon oxide ($SiO_2$) to aluminum oxide ($Al_2O_3$) mole ratio (SAR) in the range of 25-37.

In embodiments, zeolite SSZ-32 comprises a silicon oxide ($SiO_2$) to aluminum oxide ($Al_2O_3$) mole ratio (SAR) in the range of 25 to less than 40, for example, from 25 to 35, and has a crystal size in the range of about 0.1 to about 0.4 µm.

In embodiments, zeolite SSZ-32 has a crystal size in the range of about 0.1 to about 0.4 µm, about 0.1 to about 0.3 µm, or about 0.15 to about 0.25 µm. Crystal size may be measured by transmission electron microscopy (TEM) and refers to the largest dimension of the crystal.

In embodiments, the composition of zeolite SSZ-32 as synthesized and in the anhydrous state, in terms of mole ratios of oxides is as follows: (0.05 to 2.0)$Q_2O$:(0.1 to 2.0)$M_2O$:$Al_2O_3$:(20 to less than 40)$SiO_2$ wherein M is an alkali metal cation, and Q is an N-lower alkyl-N'-isopropyl-imidazolium cation (for example an N,N'-diisopropyl-imidazolium cation, or N-methyl-N'-isopropyl-imidazolium cation).

In embodiments, the zeolite SSZ-32, as-synthesised, has a crystalline structure whose X-ray powder diffraction shows the following characteristic lines:

| d/n | Int. $I/I_o$ |
|---|---|
| 11.05 | 26 |
| 10.05 | 10 |
| 7.83 | 17 |
| 4.545 | 71 |
| 4.277 | 71 |

-continued

| d/n | Int. $I/I_o$ |
|---|---|
| 3.915 | 100 |
| 3.726 | 98 |

The X-ray powder diffraction patterns were determined by standard techniques. The radiation was the K-alpha/doublet of copper and a scintillation counter spectrometer with a strip-chart pen recorder was used. The peak heights I and the positions, as a function of 2Θ where Θ is the Bragg angle, were read from the spectrometer chart. From these measured values, the relative intensities, 100 $I/I_o$, where $I_o$ is the intensity of the strongest line or peak, and d, the interplanar spacing in Angstroms corresponding to the recorded lines, can be calculated. The X-ray diffraction pattern above is characteristic of novel SSZ-32 zeolites. The zeolite produced by exchanging the metal or other cations present in the zeolite with various other cations yields substantially the same diffraction pattern although there can be minor shifts in interplanar spacing and minor variations in relative intensity. Minor variations in the diffraction pattern can also result from variations in the organic compound used in the preparation and from variations in the silica-to-alumina mole ratio from Sample to sample. Calcination can also cause minor shifts in the X-ray diffraction pattern. Notwithstanding these minor perturbations, the basic crystal lattice structure remains unchanged.

Preparation of SSZ-32

SSZ-32 zeolites can be prepared as described in U.S. Pat. No. 5,397,454. SSZ-32 zeolites can be prepared from an aqueous solution containing sources of an alkali metal oxide, N-lower alkyl-N'-isopropyl-imidazolium cation (for example N,N'-diisopropyl-imidazolium cation or N-methyl-N'-isopropyl-imidazolium cation), an oxide of aluminum (for example wherein the aluminum oxide source provides aluminum oxide which is in a covalently dispersed form on silica), and an oxide of silicon. In embodiments, the reaction mixture has a composition in terms of mole ratios falling within the following ranges:

| Components | Mole Ratio |
|---|---|
| $SiO_2/Al_2O_3$ | 20-less than 40 |
| $OH^-/SiO_2$ | 0.1-1.0 |
| $Q/SiO_2$ | 0.05-0.50 |
| $M^+/SiO_2$ | 0.05-0.30 |
| $H_2O/SiO_2$ | 20-300 |
| $Q/Q + M^+$ | 0.25-0.75 | where Q is an N-lower alkyl-N'-isopropyl imidazolium cation (for example, an N,N'-diisopropyl imidazolium cation or N-methyl-N'-isopropyl imidazolium cation). M is an alkali metal ion (for example, sodium or potassium). The organic cation compound which acts as a source of the quaternary ammonium ion employed can provide hydroxide ion.

In embodiments, the reaction mixture has a composition in terms of mole ratios falling within the following ranges:

| Components | Mole Ratio |
|---|---|
| $SiO_2/Al_2O_3$ | 30-35 |
| $OH^-/SiO_2$ | 0.20-0.40 |
| $Q/SiO_2$ | 0.15-0.30 |

-continued

| Components | Mole Ratio |
| --- | --- |
| $M^+/SiO_2$ | 0.15-0.30 |
| $H_2O/SiO_2$ | 25-60 |
| $Q/Q + M^+$ | 0.33-0.67 | where Q is an N-lower alkyl-N'-isopropyl imidazolium cation (for example, an N,N'-diisopropyl imidazolium cation or N-methyl-N'-isopropyl imidazolium cation). M is an alkali metal ion (for example, sodium or potassium). The organic cation compound which acts as a source of the quaternary ammonium ion employed can provide hydroxide ion.

Sources of aluminum oxide for the reaction mixture include aluminates, alumina, and aluminum compounds, such as aluminum coated silica colloids, $Al_2(SO_4)_3$, and other zeolites. In embodiments, zeolites of pentasil structure and lower $SiO_2/Al_2O_3$ values (approximately 10) can be used as aluminum oxide sources, such as Mordenite and ferrierite zeolites.

Sources of silicon oxide include silicates, silica hydrogel, silicic acid, colloidal silica, fumed silicas, tetraalkyl orthosilicates, and silica hydroxides.

The reaction mixture is maintained at an elevated temperature until the crystals of the zeolite are formed. The temperatures during the hydrothermal crystallization step may be maintained from about 140° C. to about 200° C., for example from about 160° C. to about 180° C., or from about 170° C. to about 180° C. The crystallization period may be greater than 1 day, for example from about 5 days to about 10 days.

The hydrothermal crystallization is conducted under pressure and usually in an autoclave so that the reaction mixture is subject to autogenous pressure. The reaction mixture can be stirred during crystallization. During the hydrothermal crystallization step, the crystals can be allowed to nucleate spontaneously from the reaction mixture. The reaction mixture can also be seeded with SSZ-32 or ZSM-23 crystals both to direct, and accelerate the crystallization, as well as to minimize the formation of undesired aluminosilicate contaminants. If the reaction mixture is seeded with crystals, the concentration of the organic compound (e.g., an alcohol) can be reduced.

Once the zeolite crystals have formed, the solid product is separated from the reaction mixture by standard mechanical separation techniques such as filtration or centrifugation. The crystals are water-washed and then dried, e.g., at 90° C. to 150° C. for from 8 to 24 hours, to obtain the as-synthesized SSZ-32x zeolite crystals. The drying step can be performed at atmospheric or subatmospheric pressures.

Zeolite SSZ-32 can be used as-synthesized or can be thermally treated (calcined) as described above for zeolite SSZ-91. Usually, it is desirable to remove the alkali metal cation by ion exchange and replace it with hydrogen, ammonium, or any desired metal ion.

SSZ-32x

Zeolite SSZ-32x is described in U.S. Pat. No. 7,468,126 which is incorporated herein by reference in its entirety. SSZ-32 zeolites may also be referred to as MTT framework type molecular sieves.

Zeolite SSZ-32x (also described as SSZ-32x molecular sieve) comprises a silicon oxide ($SiO_2$) to aluminum oxide ($Al_2O_3$) mole ratio (SAR) in the range of 20 to less than 40 and has a crystal size in the range of about 50 to about 500 Angstrom. In embodiments, zeolite SSZ-32x comprises a silicon oxide ($SiO_2$) to aluminum oxide ($Al_2O_3$) mole ratio (SAR) in the range of 20-39, 20-38, 20-37, 25-39, 25-38, 30-37, 30-35 or 25-35. In embodiments, the zeolite SSZ-32x (also described as SSZ-32x molecular sieves) comprises a silicon oxide ($SiO_2$) to aluminum oxide ($Al_2O_3$) mole ratio (SAR) in the range of 30-35.

In embodiments, zeolite SSZ-32x has a crystal size in the range of about 50 to about 500 Angstrom, about 100 to about 500 Angstrom, about 100 to about 400 Angstrom, or about 200 to about 400 Angstrom. Crystal size may be measured by transmission electron microscopy (TEM) and refers to the largest dimension of the crystal.

In embodiments, the zeolite SSZ-32x comprises a silicon oxide ($SiO_2$) to aluminum oxide ($Al_2O_3$) mole ratio (SAR) in the range of 30-35 and has a crystal size in the range of about 200 to about 400 Angstrom.

As determined by TEM studies, crystallites of SSZ-32x are elongate. In embodiments, crystallites of SSZ-32x have a length/width ratio in the range from about 2.0 to about 2.4.

In embodiments, the zeolite SSZ-32x, as-synthesised, has a crystalline structure whose X-ray powder diffraction shows the following characteristic lines:

| $2\theta$ | d-spacing (Å) | Intensity | Relative Intensity (%) ($I/I_o \times 100$) |
| --- | --- | --- | --- |
| 8.00 | 11.05 | 15 | 26 |
| 8.80 | 10.05 | 6 | 10 |
| 11.30 | 7.83 | 10 | 17 |
| 14.50 | 6.11 | 1 | 2 |
| 15.75 | 5.63 | 3 | 5 |
| 16.50 | 5.37 | 3 | 5 |
| 18.10 | 4.901 | 7 | 12 |
| 19.53 | 4.545 | 41 | 71 |
| 20.05 | 4.428 | 6 shoulder | 10 shoulder |
| 20.77 | 4.277 | 41 | 71 |
| 21.30 | 4.171 | 7 | 12 |
| 22.71 | 3.915 | 58 | 100 |
| 23.88 | 3.726 | 57 | 98 |
| 24.57 | 3.623 | 30 | 52 |
| 25.08 | 3.551 | 25 | 43 |
| 25.88 | 3.443 | 27 | 47 |
| 26.88 | 3.317 | 5 | 9 |
| 28.11 | 3.174 | 6 | 10 |

Preparation of Zeolite SSZ-32x

SSZ-32x zeolites can be prepared as described in U.S. Pat. No. 7,468,126. SSZ-32x can be prepared from an aqueous solution containing sources of an alkali metal oxide, N-lower alkyl-N'-isopropyl-imidazolium cation (for example, N,N'-diisopropyl-imidazolium cation or N-methyl-N'-isopropyl-imidazolium cation), an oxide of aluminum (for example wherein the aluminum oxide source provides aluminum oxide which is in a covalently dispersed form on silica), and an oxide of silicon. In embodiments, the reaction mixture has a composition in terms of mole ratios falling within the following ranges:

| Components | Mole Ratio |
| --- | --- |
| $SiO_2/Al_2O_3$ | 20-less than 40 |
| $OH^-/SiO_2$ | 0.1-1.0 |
| $Q/SiO_2$ | 0.05-0.50 |
| $M^+/SiO_2$ | 0.05-0.30 |
| $H_2O/SiO_2$ | 20-300 |
| $Q/Q + M^+$ | 0.25-0.75 | where Q is the sum of $Q_a$, and $Q_b$, $Q_a$ is an N-lower alkyl-N'-isopropyl imidazolium cation (for example, an N,N'-diisopropyl imidazolium cation or N-methyl-N'-isopropyl imidazolium cation). $Q_b$ is an amine. Isobutyl, neopentyl or monoethyl amine are suitable examples of $Q_b$, although other amines may be used. The molar concentration of amine, $Q_b$, must be greater than the molar concentration of the imidazolium compound, $Q_a$. In embodiments, the molar concentration of $Q_b$ is in the range from 2 to about nine times the molar concentration of $Q_a$. M is an alkali metal ion (for example, sodium or potassium). The organic cation compound which acts as a source of the quaternary ammonium ion employed can provide hydroxide ion.

In embodiments, the reaction mixture has a composition in terms of mole ratios falling within the following ranges:

| Components | Mole Ratio |
|---|---|
| $SiO_2/Al_2O_3$ | 30-35 |
| $OH^-/SiO_2$ | 0.20-0.40 |
| $Q/SiO_2$ | 0.15-0.30 |
| $M^+/SiO_2$ | 0.15-0.30 |
| $H_2O/SiO_2$ | 25-60 |
| $Q/Q + M^+$ | 0.33-0.67 | where Q is the sum of $Q_a$ and $Q_b$, $Q_a$ is an N-lower alkyl-N'-isopropyl imidazolium cation (for example, an N,N'-diisopropyl imidazolium cation or N-methyl-N'-isopropyl imidazolium cation). $Q_b$ is an amine. Isobutyl, neopentyl or monoethyl amine are suitable examples of $Q_b$, although other amines may be used. The molar concentration of amine, $Q_b$, must be greater than the molar concentration of the imidazolium compound, $Q_a$. In embodiments, the molar concentration of $Q_b$ is in the range from 2 to about nine times the molar concentration of $Q_a$. M is an alkali metal ion (for example, sodium or potassium). The organic cation compound which acts as a source of the quaternary ammonium ion employed can provide hydroxide ion.

Sources of aluminum oxide for the reaction mixture include aluminates, alumina, and aluminum compounds, such as aluminum coated silica colloids, $Al_2(SO_4)_3$, and other zeolites. In embodiments, zeolites of pentasil structure and lower $SiO_2/Al_2O_3$ values (approximately 10) can be used as aluminum oxide sources, such as Mordenite and ferrierite zeolites.

Sources of silicon oxide include silicates, silica hydrogel, silicic acid, colloidal silica, fumed silicas, tetraalkyl orthosilicates, and silica hydroxides.

The reaction mixture is maintained at an elevated temperature until the crystals of the zeolite are formed. The temperatures during the hydrothermal crystallization step may be maintained from about 140° C. to about 200° C., for example from about 160° C. to about 180° C., or from about 170° C. to about 180° C. The crystallization period may be greater than 1 day, for example from about 5 days to about 10 days.

The hydrothermal crystallization is conducted under pressure and usually in an autoclave so that the reaction mixture is subject to autogenous pressure. The reaction mixture can be stirred while components are added as well as during crystallization. During the hydrothermal crystallization step, the crystals can be allowed to nucleate spontaneously from the reaction mixture. The reaction mixture can also be seeded with SSZ-32 crystals both to direct, and accelerate the crystallization, as well as to minimize the formation of undesired aluminosilicate contaminants.

Once the zeolite crystals have formed, the solid product is separated from the reaction mixture by standard mechanical separation techniques such as filtration or centrifugation. The crystals are water-washed and then dried, e.g., at 90° C. to 150° C. for from 8 to 24 hours, to obtain the as-synthesized SSZ-32x zeolite crystals. The drying step can be performed at atmospheric or subatmospheric pressures.

Zeolite SSZ-32x can be used as-synthesized or can be thermally treated (calcined) as described above for zeolite SSZ-91. Usually, it is desirable to remove the alkali metal cation by ion exchange and replace it with hydrogen, ammonium, or any desired metal ion.

Preparation of the Hydroisomerisation Catalyst

The hydroisomerisation catalyst comprises zeolite SSZ-91, zeolite SSZ-32 or zeolite SSZ-32x. The zeolite SSZ-91, zeolite SSZ-32 or zeolite SSZ-32x may be in their as synthesized or calcined form.

In embodiments, the hydroisomerisation catalyst is formed from zeolite SSZ-91, zeolite SSZ-32 or zeolite SSZ-32x in calcined form.

In embodiments, the hydroisomerisation catalyst comprises: a molecular sieve selected from zeolite SSZ-91, zeolite SSZ-32 or zeolite SSZ-32x; and a Group 2, 8, 9 or 10 metal (for example a Group 8-10 metal such as Pt).

In embodiments, the hydroisomerisation catalyst is formed by compositing a molecular sieve selected from zeolite SSZ-91, zeolite SSZ-32 and zeolite SSZ-32x (in as-synthesised or calcined form) with an oxide binder such as alumina. In embodiments, compositing a molecular sieve selected from zeolite SSZ-91, zeolite SSZ-32 and zeolite SSZ-32x (in as-synthesised or calcined form) with an oxide binder comprises mixing a molecular sieve selected from zeolite SSZ-91, zeolite SSZ-32 or zeolite SSZ-32x (in as-synthesised or calcined form) with an oxide binder and extruding the product. The mixture of the molecular sieve and the oxide binder may be formed into a particle or extrudate having a wide range of physical shapes and dimensions. In embodiments, the extrudate or particle may be dried and calcined prior to metal loading. In embodiments, the extrudate or particle is impregnated with a metal, e.g. a Group 2, 8, 9 or 10 metal (for example a Group 8-10 metal such as Pt). and then dried and calcined. In embodiments, the extrudate or particle is dried and calcined prior to metal loading.

In embodiments, the hydroisomerisation catalyst is prepared by:

compositing a molecular sieve (selected from zeolite SSZ-91, zeolite SSZ-32 and zeolite SSZ-32x) with an oxide binder to form an extrudate base;

impregnating the extrudate base with an impregnation solution containing a metal, for example a Group 2, 8, 9 or 10 metal (for example a Group 8-10 metal such as Pt), to form a metal-loaded extrudate;

drying the metal-loaded extrudate; and calcining the dried metal-loaded extrudate.

In embodiments, the hydroisomerisation catalyst is formed by impregnating a molecular sieve selected from zeolite SSZ-91, zeolite SSZ-32 and zeolite SSZ-32x with a solution containing a metal, for example a Group 2, 8, 9 or 10 metal (for example a Group 8-10 metal such as Pt). In embodiments, the hydroisomerisation catalyst is formed by impregnating the molecular sieve (selected from zeolite SSZ-91, zeolite SSZ-32 and zeolite SSZ-32x) in calcined form with a solution containing a Group 2, 8, 9 or 10 metal (for example a Group 8-10 metal such as Pt). In embodiments, the hydroisomerisation catalyst is formed by impregnating an extrudate base comprising the molecular sieve (selected from zeolite SSZ-91, zeolite SSZ-32 and zeolite SSZ-32x) and an oxide binder.

In embodiments, the extrudate base is exposed to an impregnation solution (for example, soaked in an impregnation solution) containing a metal (e.g. a Group 2, 8, 9 or 10 metal (for example a Group 8-10 metal such as Pt)) for 0.1 to 10 hours.

In embodiments, the extrudate base is dried (for example at a temperature in the range of about 100° F. (38° C.) to about 300° F. (149° C.) for about 0.1 to about 10 hours) and calcined (at a temperature in the range of about 390° F. (199° C.) to about 1200° F. (649° C.), or about 600° F. (316° C.) to about 1200° F. (649° C.) for about 0.1 to about 10 hours) prior to impregnation.

In embodiments, the extrudate base formed by compositing the molecular sieve (selected from zeolite SSZ-91, zeolite SSZ-32 and zeolite SSZ-32x) and an oxide binder is dried and calcined prior to impregnation. In embodiments, the dried and calcined extrudate base is impregnated with an impregnation solution to form a metal-loaded extrudate before being dried and calcined again to form the hydroisomerisation catalyst.

In embodiments, the impregnated extrudate base comprising zeolite SSZ-91, is dried at a temperature in the range of about 100° F. (38° C.) to about 300° F. (149° C.) for about 0.1 to about 10 hours.

In embodiments, the dried metal-loaded extrudate is calcined at a temperature in the range of about 600° F. (316° C.) to about 1200° F. (649° C.) for about 0.1 to about 10 hours. In embodiments, calcination takes place in air.

Process of Hydroisomerising a Diesel Feedstock

The process of hydroisomerising a diesel feedstock comprises contacting a diesel feedstock with a hydroisomerisation catalyst. In embodiments, hydroisomerising of the diesel feedstock occurs in the presence of hydrogen.

In an embodiment as shown in FIG. 1, a diesel feedstock 10 is be fed into a hydroisomerisation reactor 14 along with hydrogen 12, the hydroisomerisation reactor 14 containing a hydroisomerisation catalyst 16. Within the reactor 14, the diesel feedstock 10 is contacted with the hydroisomerisation catalyst 16 under hydroisomerisation conditions in the presence of hydrogen to provide a hydroisomerised stream 18.

In embodiments, the hydroisomerisation catalyst 16 is activated prior to the introduction of the diesel feedstock into the hydroisomerisation reactor 14. In embodiments, activation of the catalyst comprises reduction at a temperature of 450 to 650° F. (232 to 343° C.) for 1 to 10 hours, for example, at a temperature of 500° F. (260° C.) for 2 hours.

In embodiments, the hydroisomerisation catalyst is a layered catalyst. In embodiments, the hydroisomerisation catalyst comprises a first layer comprising a first hydroisomerisation catalyst and a second layer comprising a second hydroisomerisation catalyst.

In embodiments, the first or second hydroisomerisation catalyst comprises zeolite SSZ-91 as described herein and the first and second hydroisomerisation catalysts are mutually exclusive. In embodiments, the first and second hydroisomerisation catalyst independently comprise zeolite SSZ-91 and a Group 8-10 metal.

In embodiments, the first or second hydroisomerisation catalyst comprises zeolite SSZ-32 as described herein and the first and second hydroisomerisation catalysts are mutually exclusive. In embodiments, the first and second hydroisomerisation catalyst independently comprise zeolite SSZ-32 and a Group 8-10 metal.

In embodiments, the first or second hydroisomerisation catalyst comprises zeolite SSZ-32x as described herein and the first and second hydroisomerisation catalysts are mutually exclusive. In embodiments, the first and second hydroisomerisation catalyst independently comprise zeolite SSZ-32x and a Group 8-10 metal.

In embodiments, the first or second hydroisomerisation catalyst comprises zeolite SSZ-32 or zeolite SSZ-32x as described herein and the first and second hydroisomerisation catalysts are mutually exclusive. In embodiments, the first and second hydroisomerisation catalyst independently comprise zeolite SSZ-32 or zeolite SSZ-32x and a Group 8-10 metal.

Figure 2:
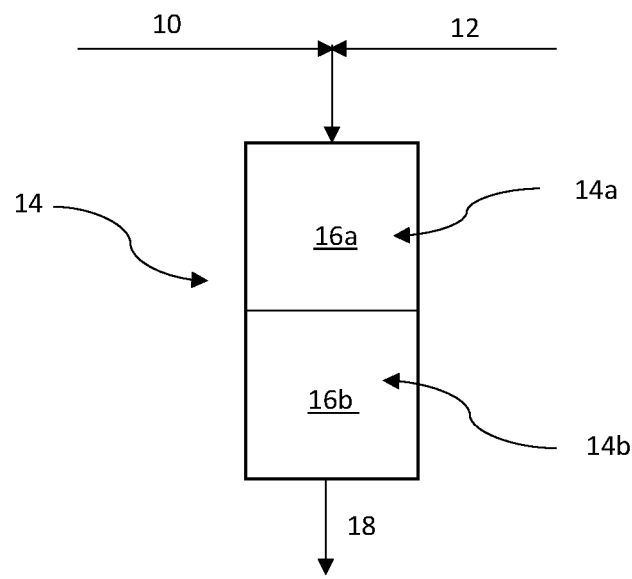
FIG. 2 schematically represents a process for hydroisomerising diesel feedstocks according to an embodiment of the present invention.

In an embodiment shown in FIG. 2, a diesel feedstock 10 is fed into a hydroisomerisation reactor 14 along with hydrogen 12, the hydroisomerisation reactor 14 containing a layered hydroisomerisation catalyst comprising a first hydroisomerisation catalyst 16a and a second hydroisomerisation catalyst 16b, the first hydroisomerisation catalyst 16a being located upstream of the second hydroisomerisation catalyst 16b. In the embodiment shown in FIG. 2, the diesel feedstock is contacted with the first hydroisomerisation catalyst 16a within a first hydroisomerisation zone 14a of the hydroisomerisation reactor 14 in the presence of hydrogen before contacting the second hydroisomerisation catalyst 16b in the presence of hydrogen in a second hydroisomerisation zone 14b.

In embodiments, the hydroisomerisation conditions (for example the hydroisomerisation conditions in reactor 14) include a temperature in the range of about 390° F. to about 800° F. (199° C. to 427° C.), for example, about 550° F. to about 700° F. (288° C. to 371° C.).

In embodiments, the hydroisomerisation conditions (for example the hydroisomerisation conditions in reactor 14) include a pressure in the range of about 15 to about 3000 psig (0.10 to 20.68 MPa gauge), for example about 100 to about 2500 psig (0.69 to 17.24 MPa).

In embodiments, the hydroisomerisation conditions (for example the hydroisomerisation conditions in reactor 14) include a feed rate of the diesel feedstock to the reactor containing the hydroisomerisation catalyst at a rate in the range from about 0.1 to about 20 h$^{-1}$ LHSV, for example from about 0.1 to about 5 h$^{-1}$ LHSV.

In embodiments, the hydroisomerisation conditions (for example the hydroisomerisation conditions in reactor 14) include hydrogen and diesel feedstock fed to the reactor in a ratio from about 2000 to about 10,000 standard cubic feet $H_2$ per barrel diesel feedstock (from about 360 to about 1800 $m^3H_2/m^3$ feed, for example from about 2500 to about 5000 scf $H_2$ per barrel diesel feedstock (from about 440 to about 890 $m^3H_2/m^3$ feed).

In embodiments, hydroisomerisation conditions (for example the hydroisomerisation conditions in reactor 14) are as follows:
  temperature in the range of about 390° F. to about 800° F. (199° C. to 427° C.), for example about 550° F. to about 750° F. (288° C. to 399° C.), or 570° F. to about 675° F. (299° C. to 357° C.);
  pressure in the range of about 15 to about 3000 psig (0.10 to 20.68 MPa gauge), for example about 100 to about 2500 psig (0.69 to 17.24 MPa);
  feed rate of diesel feedstock to the reactor containing the hydroisomerisation catalyst at a rate in the range from about 0.1 to about 20 h-1 LHSV, for example from about 0.1 to about 5 h$^{-1}$ LHSV; and
  hydrogen and diesel feedstock fed to the reactor in a ratio from about 2000 to about 10,000 standard cubic feet $H_2$ per barrel diesel feedstock (from about 360 to about 1800 $m^3H_2/m^3$ feed, for example from about 2500 to about 5000 scf $H_2$ per barrel diesel feedstock (from about 440 to about 890 $m^3H_2/m^3$ feed).

In embodiments, contacting the diesel feedstock and the hydroisomerisation catalyst the process provides a diesel fuel comprising an increased ratio of isoparaffins to normal paraffins compared to the diesel feedstock.

In embodiments, contacting the diesel feedstock and the hydroisomerisation catalyst provides a diesel fuel exhibiting a lower cloud point and a lower pour point compared to the cloud point and pour point of the diesel feedstock.

In embodiments, contacting the diesel feedstock and the hydroisomerisation catalyst provides a diesel fuel exhibiting a lower cloud point and a lower pour point compared to the cloud point and pour point of the diesel feedstock, wherein the diesel fuel exhibits a cloud point at least 10° C. lower than the cloud point of the diesel feedstock and a pour point at least 10° C. lower than the pour point of the diesel feedstock, or a cloud point at least 20° C. lower than the cloud point of the diesel feedstock and a pour point at least 20° C. lower than the pour point of the diesel feedstock, or a cloud point at least 30° C. lower than the cloud point of the diesel feedstock and a pour point at least 30° C. lower than the pour point of the diesel feedstock.

Hydrotreatment of the Diesel Feedstock Prior to Hydroisomerisation

In embodiments, the diesel feedstock is be contacted with a hydrotreating catalyst under hydrotreating conditions prior to contacting the diesel feedstock with the hydroisomerisation catalyst. In embodiments, the hydrotreating conditions are as follows:

temperature in the range of about 390° F. to about 800° F. (199° C. to 427° C.), for example about 550° F. to about 750° F. (288° C. to 399° C.), 590° F. to about 675° F. (310° C. to 357° C.).;

pressure in the range of about 15 to about 3000 psig (0.10 to 20.68 MPa gauge), for example about 100 to about 2500 psig (0.69 to 17.24 MPa);

feed rate of diesel feedstock to the reactor containing the hydroisomerisation catalyst at a rate in the range from about 0.1 to about 20 $h^{-1}$ LHSV, for example from about 0.1 to about 5 $h^{-1}$ LHSV; and hydrogen and diesel feedstock fed to the reactor in a ratio from about 2000 to about 10,000 standard cubic feet $H_2$ per barrel diesel feedstock (from about 360 to about 1800 $m^3H_2/m^3$ feed), for example from about 2500 to about 5000 scf $H_2$ per barrel diesel feedstock (from about 440 to about 890 $m^3H_2/m^3$ feed).

Hydrotreating catalysts may comprise a refractory inorganic oxide support and a Group 6 metal modifier and/or a Group 8-10 metal modifier. In embodiments, the hydrotreating catalyst comprises a refractory inorganic oxide support, a Group 6 metal modifier and a Group 8-10 metal modifier. The oxide support may also be referred to herein as a binder. The support of the hydrotreating catalyst may be prepared from or comprise alumina, silica, silica/alumina, titania, magnesia, zirconia, and the like, or combinations thereof. The hydrotreating catalyst support may comprise amorphous materials, crystalline materials, or combinations thereof. Examples of amorphous materials include, but are not limited to, amorphous alumina, amorphous silica, amorphous silica-alumina, and the like.

In embodiments, the hydrotreating support may comprise amorphous alumina. When using a combination of silica and alumina, the distribution of silica and alumina in the support may be either homogeneous or heterogeneous. In some embodiments, the support may consist of an alumina gel in which is dispersed the silica, silica/alumina, or alumina base material. The support may also contain refractory materials other than alumina or silica, such as for example other inorganic oxides or clay particles, provided that such materials do not adversely affect the hydrogenation activity of the final catalyst or lead to deleterious cracking of the feedstock.

In embodiments, silica and/or alumina comprise at least about 90 wt. % of the support of the hydrotreating catalyst, and in some embodiments the support may be at least substantially all silica or all alumina.

In embodiments, the Group 8-10 metal modifier(s) of the hydrotreating catalyst comprises Fe, Co, Ni, Ru, Rh, Pd, Os, Ir, Pt, or combinations thereof. In embodiments, the Group 8-10 metal modifier of the hydrotreating catalyst comprises a Group 9 metal, a Group 10 metal, or combinations thereof. In embodiments, the Group 8-10 metal modifier of the hydrotreating catalyst comprises or is Co and/or Ni. In embodiments, the Group 8-10 metal modifier of the hydrotreating catalyst comprises or is Ni. In embodiments, the Group 8-10 metal modifier of the hydrotreating catalyst comprises Co and Ni. In embodiments, the Group 8-10 metal modifier is an oxide, hydroxide or salt. In embodiments, the Group 8-10 metal modifier is a salt. The amount of the Group 8-10 metal modifier in the hydrotreating catalyst is generally from 1 to 20 wt. % (for example, from 2 to 10 wt. %), based on the bulk dry weight of the catalyst, calculated as the metal oxide. In embodiments, the Group 6 metal modifier of the hydrotreating catalyst is selected from Cr, Mo, W and combinations thereof. In embodiments, the Group 6 metal modifier of the hydrotreating catalyst comprises or is Mo. In embodiments, the Group 6 metal modifier is an oxide, an oxo acid, or an ammonium salt of an oxo or polyoxoanion. The amount of the Group 6 metal modifier employed in the hydrotreating catalyst is generally from 5 to 50 wt. % (for example, from 10 to 40 wt. %, or from 15 to 30 wt. %), based on the bulk dry weight of the catalyst, calculated as the metal oxide. In embodiments the hydrotreating catalyst comprises Ni and Mo.

In embodiments, the Group 8-10 metal modifier and/or the Group 6 metal modifier of the hydrotreating catalyst may be dispersed on the inorganic oxide support. A number of methods are known in the art to deposit Group 8-10 and/or Group 6 metals, or compounds comprising such metals, onto the support; such methods include ion exchange, impregnation, and co-precipitation. In embodiments, the impregnation of the support with Group 8-10 and Group 6 metal modifiers may be performed at a controlled pH value. The Group 8-10 and Group 6 metal modifiers may be added to the impregnating solution as a metal salt, such as a halide salt, and/or an amine complex, and/or a salt of a mineral acid. Other examples of metal salts that may be used include nitrates, carbonates, and bicarbonates, as well as carboxylic acid salts such as acetates, citrates, and formates.

Optionally, the impregnated support may be allowed to stand with the impregnating solution, e.g., for a period in the range from about 2 to about 24 hours. Following impregnation of the oxide support with the Group 8-10 metal modifier and/or Group 6 metal modifier, the impregnated support can be dried and/or calcined. After the hydrotreating catalyst has been dried and calcined, the prepared catalyst may be reduced with hydrogen or sulfided with a sulfur-containing compound, as is conventional in the art, and placed into service, for example in a hydrotreating reactor positioned upstream of the hydroisomerisation reactor.

EXAMPLES

The following illustrative examples are intended to be non-limiting.

SUMMARY OF THE EXAMPLES

The Examples below demonstrate that the processes and methods described herein efficiently provide high yield diesel fuels exhibiting excellent cold flow properties.

Example 1—Provision of Catalyst Comprising Zeolite SSZ-91—Catalyst E

Zeolite SSZ-91 was prepared in accordance with U.S. Pat. No. 9,920,260 (which is incorporated herein by reference) and as described herein, e.g., paragraph [0074] et seq above.

The zeolite SSZ-91 was then composited with alumina to provide a mixture containing 65 wt. % zeolite SSZ-91. The mixture was extruded, dried and calcined to form an extrudate base. The extrudate base was impregnated with a solution containing platinum. The impregnated catalyst was then dried in air before being calcined to provide the catalyst (Catalyst E). The overall platinum loading of the catalyst product (referred to herein as Catalyst E) was 0.6 wt. % (by total weight of catalyst).

Example 2—Provision of Catalyst Comprising Zeolite SSZ-32x—Catalyst A

Zeolite SSZ-32x was prepared in accordance with U.S. Pat. No. 7,468,126 (which is incorporated herein by reference) and as described herein, e.g., paragraph [00124] et seq above.

The zeolite SSZ-32x was then composited with alumina to provide a mixture containing 45 wt. % zeolite SSZ-32x. The mixture was extruded, dried and calcined to form an extrudate base. The extrudate base was impregnated with a solution containing platinum. The impregnated catalyst was then dried in air before being calcined to provide the catalyst (Catalyst A). The overall platinum loading of the catalyst product (referred to herein as Catalyst A) was 1 wt. %.

Example 3—Provision of Catalyst Comprising Zeolite SSZ-32x—Catalyst B

A catalyst comprising zeolite SSZ-32x was prepared according to Example 2, except the dried and calcined extrudate was impregnated with a solution containing platinum to provide a catalyst (referred to herein as Catalyst B) with overall platinum loading of 0.325 wt. %.

Example 4—Provision of Catalyst Comprising Zeolite SSZ-32—Catalyst C

Zeolite SSZ-32 was prepared in accordance with U.S. Pat. No. 5,397,454 (which is incorporated herein by reference) and as described herein, e.g., paragraph [00108] et seq above.

The zeolite SSZ-32 was then composited with alumina to provide a mixture containing 65 wt. % zeolite SSZ-32. The mixture was extruded, dried and calcined to form an extrudate base. The extrudate base was impregnated with a solution containing platinum. The impregnated catalyst was then dried in air before being calcined to provide the catalyst (Catalyst C). The overall platinum loading of the catalyst product (referred to herein as Catalyst C) was 0.325 wt. %.

Example 5—Provision of Catalyst Comprising Zeolite SSZ-32—Catalyst D

A catalyst comprising zeolite SSZ-32 was prepared according to Example 4, except that the mixture contains 45 wt. % zeolite SSZ-32. The dried and calcined extrudate was impregnated with a solution containing platinum to provide a catalyst (referred to herein as Catalyst D) with overall platinum loading of 0.325 wt. %.

Example 6

Hydroisomerisation was performed in a micro unit equipped with a down flow fix bed reactor. Each run was operated under 600 psig total pressure. Prior to the introduction of feed, the catalyst was activated by a standard reduction procedure. Feedstock A was passed through the hydroisomerisation reactor at a LHSV of 2.6 h$^{-1}$ (Catalyst E) or 2.71 h$^{-1}$ (Catalyst A).

Feedstock A was a Fischer-Tropsch feed. The properties are listed in Table 3.

TABLE 3

| Feed A Properties | |
|---|---|
| Feedstock | FT diesel |
| API Gravity | 50.9 |
| Pour point, ° C. | −12 |
| Cloud point, ° C. | −4 |
| SIMDIST TBP (WT %), ° F. | |
| 0.5 | 261 |
| 5 | 347 |
| 30 | 457 |
| 50 | 525 |
| 70 | 601 |
| 90 | 687 |
| 99.5 | 786 |

Example 6 tested Catalyst A and E separately to process Feedstock A in accordance with the FIG. 1 process. Table 4 summarizes the diesel yield and product properties. Both catalyst A and E successfully hydroisomerised the feed and reduced the cloud point to around −38° C. The diesel yield is 95.9 wt. % and 99.6 wt. % on Catalyst A and E respectively. Catalyst E containing zeolite SSZ-91 produced 3.7 wt. % more diesel compared to Catalyst A. The products from both systems have excellent cold properties.

TABLE 4

| Diesel Yield and Properties | | |
|---|---|---|
| Catalysts | Catalyst A | Catalyst E |
| Total pressure, psig | 600 | 600 |
| H$_2$ rate, SCFB | 3000 | 3000 |
| Catalyst temperature, ° F. | 610 | 605 |
| LHSV, h$^{-1}$ | 2.71 | 2.6 |
| Diesel Yield %, 395° F.+ | 95.9 | 99.6 |
| Diesel pour point, ° C. | −44 | −43 |
| Diesel cloud point, ° C. | −38 | −37 |

Example 7

Feedstock B is derived from animal fat. The properties of Feedstock B are listed in Table 5.

TABLE 5

| Feed B Properties | |
| --- | --- |
| Feedstock | Biodiesel |
| API | 48 |
| S, ppm | 1 |
| N, ppm | 0 |
| Pour point, ° C. | 20 |
| Cloud point, ° C. | 22 |
| Boiling range, ° F. | 420-890 |

Example 7 used Catalyst B and E separately to process Feed B according to the FIG. 1 process. Table 6 summarizes the process conditions, diesel yield and product properties. Both catalyst B and E successfully hydroisomerised the feed and reduced the cloud point to <−9° C. The diesel yield is 93.3 wt. % and 96.1 wt. % for Catalyst B and E respectively. This confirms that Catalyst E composed of zeolite SSZ-91 has excellent performance in making biodiesel (diesel fuel) from animal fat.

TABLE 6

| Diesel Yield and Properties | | |
| --- | --- | --- |
| Catalysts | Catalyst B | Catalyst E |
| Total pressure, psig | 1000 | 1000 |
| H$_2$ rate, SCFB | 5000 | 5000 |
| Catalyst temperature, ° F. | 613 | 587 |
| LHSV, h$^{-1}$ | 1.3 | 1.3 |
| Diesel Yield %, 380 F.+ | 93.3 | 96.1 |
| Diesel cloud point, ° C. | −9 | −12 |

Example 8

Feedstock C is hydrotreated camelina oil. The properties are listed in Table 7. This feed has a high cloud and pour point.

TABLE 7

| Feed C Properties | |
| --- | --- |
| Feedstock | Hydrotreated Camelina Oil |
| API Gravity | 46.8 |
| Cloud point, ° C. | 30 |
| Pour point, ° C. | 26 |
| SIMDIST TBP (WT %), ° F. | |
| 0.5 | 549 |
| 5 | 575 |
| 30 | 619 |
| 50 | 620 |
| 70 | 621 |
| 90 | 652 |
| 99.5 | 782 |

Example 8 applied Catalyst C to process hydrotreated camelina oil according to the FIG. 1 process. The test was operated under 1000 psig total pressure. Feed was passed through the reactor at a LHSV of 1 h$^{-1}$. The hydrogen to oil ratio was about 5000 scfb.

Table 8 summarizes the process conditions, diesel yield and product properties. The diesel yield varied from 94 wt. % to 91 wt. % and the cloud point varied from −11° C. to −21° C. as the catalyst temperature was varied.

TABLE 8

| Diesel Yield and Properties | | | |
| --- | --- | --- | --- |
| Catalysts | Catalyst C | | |
| Total pressure, psig | 1000 | | |
| LHSV, h$^{-1}$ | 1 | | |
| H$_2$ rate, SCFB | 5000 | | |
| catalyst temperature, ° F. | 600 | 605 | 610 |
| Gas yield, wt % | 1.72 | 2.17 | 2.81 |
| C$_5$-180° F. Yield wt. % | 4.09 | 5.23 | 5.78 |
| 180° F.-250° F. Yield, wt. % | 0.63 | 0.71 | 1.41 |
| Diesel Yield 250° F.+, wt. % | 93.97 | 92.34 | 90.47 |
| Diesel cloud point, ° C. | −11 | −16 | −21 |
| Diesel pour point, ° C. | −15 | −25 | −34 |

Example 9

Feedstock D is hydrotreated canola diesel feed. The properties are listed in Table 9.

TABLE 9

| Feed D Properties | |
| --- | --- |
| Feedstock | Hydrotreated Canola Feed |
| API Gravity | 47.3 |
| Cloud point, ° C. | 26 |
| Pour point, ° C. | 26 |
| SIMDIST TBP (WT %), ° F. | |
| 0.5 | 519 |
| 5 | 576 |
| 30 | 608 |
| 50 | 611 |
| 70 | 613 |
| 90 | 615 |
| 99.5 | 897 |

Example 9 used a layering system (according to the FIG. 2 process) with Catalyst C in the first hydroisomerisation zone and Catalyst D in the second hydroisomerisation zone to process the hydrotreated canola oil. The test was operated under 1000 psig total pressure. Feed was passed through the reactor at a LHSV of 1 h$^{-1}$. The hydrogen to oil ratio was 4000 scfb.

Table 10 summarizes the process conditions (for two separate process runs of Feed D through the layered catalyst system containing Catalyst C and Catalyst D), diesel yield and product properties. The diesel yield decreases from 88.7 wt. % to 84 wt. % when the cloud point decreases from −15° C. to −23° C.

TABLE 10

| Diesel Yield and Properties | | |
| --- | --- | --- |
| Catalysts | Catalyst C/Catalyst D | |
| Catalyst temperature, ° F. | 600 | 610 |
| Gas yield, wt. % | 2.5 | 3.6 |
| C5-180° F. Yield wt. % | 3.2 | 4.3 |
| 180° F.-350° F. Yield, wt. % | 6.0 | 8.7 |
| Diesel Yield 350° F.+, wt. % | 88.7 | 84.0 |

TABLE 10-continued

Diesel Yield and Properties

| Catalysts | Catalyst C/Catalyst D | |
| --- | --- | --- |
| Diesel cloud point, ° C. | −15 | −23 |
| Diesel pour point, ° C. | −31 | −45 |

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

For the avoidance of doubt, the present application is directed to the subject-matter described in the following numbered paragraphs:

1. A process for hydroisomerising a diesel feedstock, the process comprising contacting a diesel feedstock with a hydroisomerisation catalyst,
wherein the diesel feedstock comprises or is a biocomponent feed or a Fischer-Tropsch feed, and the hydroisomerisation catalyst comprises zeolite SSZ-91, zeolite SSZ-32 or zeolite SSZ-32x.
2. A process for upgrading a diesel feedstock, the process comprising:
contacting a diesel feedstock with a hydroisomerisation catalyst under hydroisomerisation conditions to provide a diesel fuel having a reduced cloud point and a reduced pour point compared to the cloud point and pour point of the diesel feedstock, wherein the diesel feedstock comprises or is a biocomponent feed or a Fischer-Tropsch feed, and the hydroisomerisation catalyst comprises zeolite SSZ-91, zeolite SSZ-32 or zeolite SSZ-32x.
3. A process according to paragraph 1 or 2, wherein the hydroisomerisation catalyst comprises zeolite SSZ-91 and a Group 8-10 metal.
4. A process according to any of paragraphs 1-3, wherein the hydroisomerisation catalyst comprises zeolite SSZ-91, wherein the zeolite SSZ-91 has, in its calcined form, an X-ray diffraction pattern substantially as shown in the following Table:

| 2-Theta$^{(a)}$ | d-spacing (nm) | Relative Intensity$^{(b)}$ |
| --- | --- | --- |
| 7.67 | 1.152 | M |
| 8.81 | 1.003 | W |
| 12.61 | 0.701 | W |
| 15.30 | 0.579 | W |
| 21.25 | 0.418 | VS |
| 23.02 | 0.386 | VS |
| 24.91 | 0.357 | W |
| 26.63 | 0.334 | W |
| 29.20 | 0.306 | W |
| 31.51 | 0.284 | W |

$^{(a)}$±0.20
$^{(b)}$wherein powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

5. A process according to any of paragraphs 1 to 4, wherein the hydroisomerisation catalyst comprises zeolite SSZ-91 having a silicon oxide to aluminum oxide ratio of 70 to 160, or 80 to 160, or 80 to 140, or 100 to 160.
6. A process according to any of paragraphs 1 to 5, wherein the hydroisomerisation catalyst comprises zeolite SSZ-91 having at least about 80% polytype 6 of the total ZSM-48-type material present in the zeolite SSZ-91, or at least about 90% polytype 6 of the total ZSM-48-type material present in the zeolite SSZ-91.
7. A process according to any of paragraphs 1 to 6, wherein the hydroisomerisation catalyst comprises zeolite SSZ-91 and the zeolite SSZ-91 comprises 0.1 to 4.0 wt. % EUO-type molecular sieve phase.
8. A process according to any of paragraphs 1 to 7, wherein the hydroisomerisation catalyst comprises zeolite SSZ-91 comprising 0.1 to 4.0 wt. % EU-1.
9. A process according to any of paragraphs 1 to 8, wherein the hydroisomerisation catalyst comprises zeolite SSZ-91 having a morphology characterized as polycrystalline aggregates comprising crystallites collectively having an average aspect ratio of 1 to 4.
10. A process according to any of paragraphs 1 to 9, wherein the hydroisomerisation catalyst comprises zeolite SSZ-91 having:
a silicon oxide to aluminum oxide ratio of 70 to 160;
a morphology characterized as polycrystalline aggregates comprising crystallites collectively having an average aspect ratio in the range of 1 to 4;
at least about 80% polytype 6 of the total ZSM-48-type material present in the zeolite SSZ-91; and
0.1 to 4.0 wt. % EUO-type molecular sieve phase.
11. A process according to any of paragraphs 1 to 10, wherein the hydroisomerisation catalyst comprises from about 5 to about 95 wt. % zeolite SSZ-91, and from about 0.05 to about 2.0 wt. % of a metal modifier.
12. A process according to paragraph 1 or 2, wherein the hydroisomerisation catalyst comprises zeolite SSZ-32 and a Group 8-10 metal.
13. A process according to any of paragraphs 1, 2 or 12, wherein the zeolite SSZ-32 comprises a silicon oxide ($SiO_2$) to aluminum oxide ($Al_2O_3$) mole ratio (SAR) in the range of 25-37.
14. A process according to any of paragraphs 1, 2, 12 or 13, wherein the zeolite SSZ-32 has a crystal size in the range of about 0.1 μm to about 0.4 μm.
15. A process according to any of paragraphs 1, 2, or 12-14 wherein the zeolite SSZ-32 as-synthesised, has a crystalline structure whose X-ray powder diffraction shows the following characteristic lines:

| d/n | Int. I/I$_o$ |
| --- | --- |
| 11.05 | 26 |
| 10.05 | 10 |
| 7.83 | 17 |
| 4.545 | 71 |
| 4.277 | 71 |
| 3.915 | 100 |
| 3.726 | 98. |

16. A process according to paragraph 1 or 2, wherein the hydroisomerisation catalyst comprises zeolite SSZ-32x and a Group 8-10 metal.
17. A process according to any of paragraphs 1, 2 or 16, wherein the zeolite SSZ-32x comprises a silicon oxide ($SiO_2$) to aluminum oxide ($Al_2O_3$) mole ratio (SAR) in the range of 25-37.
18. A process according to any of paragraphs 1, 2, 16 or 17, wherein the zeolite SSZ-32x has a crystal size in the range of about 100 to about 400 Angstrom.
19. A process according to any of paragraphs 1, 2, or 16-18 wherein the zeolite SSZ-32x as-synthesised, has a crystalline structure whose X-ray powder diffraction shows the following characteristic lines:

| 2θ | d-spacing (Å) | Intensity | Relative Intensity (%) (I/I$_o$ × 100) |
|---|---|---|---|
| 8.00 | 11.05 | 15 | 26 |
| 8.80 | 10.05 | 6 | 10 |
| 11.30 | 7.83 | 10 | 17 |
| 14.50 | 6.11 | 1 | 2 |
| 15.75 | 5.63 | 3 | 5 |
| 16.50 | 5.37 | 3 | 5 |
| 18.10 | 4.901 | 7 | 12 |
| 19.53 | 4.545 | 41 | 71 |
| 20.05 | 4.428 | 6 shoulder | 10 shoulder |
| 20.77 | 4.277 | 41 | 71 |
| 21.30 | 4.171 | 7 | 12 |
| 22.71 | 3.915 | 58 | 100 |
| 23.88 | 3.726 | 57 | 98 |
| 24.57 | 3.623 | 30 | 52 |
| 25.08 | 3.551 | 25 | 43 |
| 25.88 | 3.443 | 27 | 47 |
| 26.88 | 3.317 | 5 | 9 |
| 28.11 | 3.174 | 6 | 10. |

20. A process according to any of paragraphs 12-19, wherein the hydroisomerisation catalyst comprises zeolite SSZ-32, or zeolite SSZ-32x, and from about 0.05 to about 2.0 wt. % of a metal modifier.

21. A process according to any of paragraphs 1 to 20, wherein the hydroisomerisation catalyst is a layered catalyst.

22. A process according to paragraph 21, wherein the hydroisomerisation catalyst comprises a first layer comprising a first hydroisomerisation catalyst and a second layer comprising a second hydroisomerisation catalyst, the first hydroisomerisation catalyst situated in a first hydroisomerisation zone and the second hydroisomerisation catalyst situated in a second hydroisomerisation zone.

23. A process according to paragraph 21 or 22 when dependent on any of paragraphs 1-12, wherein the hydroisomerisation catalyst comprises at least one layer comprising zeolite SSZ-91.

24. A process according to any of paragraphs 21-23 when dependent on any of paragraphs 1-11, wherein the layered catalyst comprising a first layer comprising a first hydroisomerisation catalyst and a second layer comprising a second hydroisomerisation catalyst, wherein the first or second hydroisomerisation catalyst comprises zeolite SSZ-91 and the first and second hydroisomerisation catalysts are mutually exclusive.

25. A process according to paragraph 24, wherein the first and second hydroisomerisation catalyst comprise zeolite SSZ-91 and a Group 8-10 metal.

26. A process according to any of paragraphs 1, 2, or 12-22, wherein the hydroisomerisation catalyst is a layered catalyst and wherein the hydroisomerisation catalyst comprises at least one layer comprising zeolite SSZ-32 or SSZ-32x.

27. A process according to any of paragraphs 1, 2, or 12-22, wherein the hydroisomerisation catalyst is a layered catalyst, the layered catalyst comprising a first layer comprising a first hydroisomerisation catalyst and a second layer comprising a second hydroisomerisation catalyst, wherein the first or second hydroisomerisation catalyst comprises zeolite SSZ-32 or SSZ-32x and the first and second hydroisomerisation catalysts are mutually exclusive.

28. A process according to paragraph 27, wherein the first and second hydroisomerisation catalyst comprise zeolite SSZ-32 and a Group 8-10 metal.

29. A process according to paragraph 27, wherein the first and second hydroisomerisation catalyst comprise zeolite SSZ-32x and a Group 8-10 metal.

30. A process according to any of the preceding paragraphs, wherein the diesel feedstock comprises or is a Fischer-Tropsch feed and the Fischer-Tropsch feed has a 90% distillation temperature of less than about 750° F. (about 399° C.), for example less than about 700° F. (about 371° C.).

31. A process according to any of the preceding paragraphs, wherein the diesel feedstock comprises or is a biocomponent feed selected from vegetable oils and animal fats which comprise triglycerides and free fatty acids, for example wherein the biocomponent feed is selected from canola oil, corn oil, soy oils, castor oil, camelina oil, palm oil and combinations thereof.

32. A process according to any of the preceding paragraphs, wherein the diesel feedstock is contacted with the hydroisomerisation catalyst and hydrogen under hydroisomerisation conditions in an isomerization reactor, the hydroisomerisation conditions being:
 temperature in the range of about 390° F. to about 800° F. (199° C. to 427° C.);
 pressure in the range of about 15 to about 3000 psig (0.10 to 20.68 MPa gauge);
 feed rate of diesel feedstock to the reactor containing the hydroisomerisation catalyst at a rate in the range from about 0.1 to about 20 h$^{-1}$ LHSV; and
 hydrogen and diesel feedstock fed to the reactor in a ratio from about 2000 to about 10,000 standard cubic feet H$_2$ per barrel diesel feedstock (from about 360 to about 1800 m$^3$H$_2$/m$^3$ feed).

33. A process according to any of the preceding paragraphs, further comprising contacting the diesel feedstock with a hydrotreating catalyst under hydrotreating conditions prior to contacting the diesel feedstock with the hydroisomerisation catalyst.

34. A process according to paragraph 33, the hydrotreating conditions being:
 temperature in the range of about 390° F. to about 800° F. (199° C. to 427° C.);
 pressure in the range of about 15 to about 3000 psig (0.10 to 20.68 MPa gauge);
 feed rate of diesel feedstock to the reactor containing the hydrotreating catalyst at a rate in the range from about 0.1 to about 20 h$^{-1}$ LHSV; and
 hydrogen and diesel feedstock fed to the reactor in a ratio from about 2000 to about 10,000 standard cubic feet H$_2$ per barrel diesel feedstock (from about 360 to about 1800 m$^3$H$_2$/m$^3$ feed).

35. A process according to paragraph 1 or paragraphs 3-34, wherein contacting the diesel feedstock and the hydroisomerisation catalyst provides a diesel fuel exhibiting a lower cloud point and a lower pour point compared to the cloud point and pour point of the diesel feedstock.

36. A process according to paragraph 2 or paragraph 35, wherein the diesel fuel exhibits a cloud point at least 10° C. lower than the cloud point of the diesel feedstock and a pour point at least 10° C. lower than the pour point of the diesel feedstock, or a cloud point at least 20° C. lower than the cloud point of the diesel feedstock and a pour point at least 20° C. lower than the pour point of the diesel feedstock, or a cloud point at least 30° C. lower than the cloud point of the diesel feedstock and a pour point at least 30° C. lower than the pour point of the diesel feedstock.

37. The use of a hydroisomerisation catalyst comprising zeolite SSZ-91, zeolite SSZ-32 or zeolite SSZ-32x to provide a diesel fuel exhibiting a lower cloud point and a lower pour point compared to the cloud point and pour point of a diesel feedstock from which the diesel fuel is produced, wherein the diesel fuel is produced by contacting the diesel feedstock and the hydroisomerisation catalyst and the diesel feedstock comprises or is a biocomponent feed or a Fischer-Tropsch feed.

38. A process for providing a diesel fuel exhibiting a lower cloud point and a lower pour point compared to the cloud point and pour point of a diesel feedstock from which the diesel fuel is produced, the process comprising contacting a diesel feedstock and a hydroisomerisation catalyst comprising zeolite SSZ-91, zeolite SSZ-32 or zeolite SSZ-32x under hydroisomerisation conditions to provide a diesel fuel exhibiting a lower cloud point and a lower pour point compared to the cloud point and pour point of the diesel feedstock from which the diesel fuel is produced, wherein the diesel feedstock comprises or is a biocomponent feed or a Fischer-Tropsch feed.

What is claimed is:

1. A process for hydroisomerising a diesel feedstock, the process comprising contacting a diesel feedstock with a hydroisomerisation catalyst,
wherein the diesel feedstock comprises or is a biocomponent feed selected from vegetable oils and animal fats which comprise triglycerides and free fatty acids; or a Fischer-Tropsch feed having a 90% distillation temperature of less than about 750° F. (about 399° C.), and the hydroisomerisation catalyst comprises zeolite SSZ-91.

2. A process according to claim 1, wherein the hydroisomerisation catalyst comprises zeolite SSZ-91 and a Group 8-10 metal.

3. A process according to claim 1, wherein the zeolite SSZ-91 has, in its calcined form, an X-ray diffraction pattern substantially as shown in the following Table:

| 2-Theta$^{(a)}$ | d-spacing (nm) | Relative Intensity$^{(b)}$ |
|---|---|---|
| 7.67 | 1.152 | M |
| 8.81 | 1.003 | W |
| 12.61 | 0.701 | W |
| 15.30 | 0.579 | W |
| 21.25 | 0.418 | VS |
| 23.02 | 0.386 | VS |
| 24.91 | 0.357 | W |
| 26.63 | 0.334 | W |
| 29.20 | 0.306 | W |
| 31.51 | 0.284 | W |

$^{(a)}$±0.20
$^{(b)}$wherein powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

4. A process according to claim 1, wherein the hydroisomerisation catalyst comprises zeolite SSZ-91 having at least about 80% polytype 6 of the total ZSM-48-type material present in the zeolite SSZ-91.

5. A process according to claim 1, wherein the zeolite SSZ-91 comprises 0.1 to 4.0 wt. % EUO-type molecular sieve phase.

6. A process according to claim 1, wherein the zeolite SSZ-91 comprises 0.1 to 4.0 wt. % EU-1.

7. A process according to claim 1, wherein the zeolite SSZ-91 has a morphology characterized as polycrystalline aggregates comprising crystallites collectively having an average aspect ratio of 1 to 4.

8. A process according to claim 1, wherein the zeolite SSZ-91 has:
a silicon oxide to aluminum oxide ratio of 70 to 160;
a morphology characterized as polycrystalline aggregates comprising crystallites collectively having an average aspect ratio in the range of 1 to 4;
at least about 80% polytype 6 of the total ZSM-48-type material present in the zeolite SSZ-91; and
0.1 to 4.0 wt. % EUO-type molecular sieve phase.

9. A process according to claim 1, wherein the hydroisomerisation catalyst comprises from about 5 to about 95 wt. % zeolite SSZ-91, and from about 0.05 to about 2.0 wt. % of a metal modifier.

10. A process according to claim 1, wherein the hydroisomerisation catalyst further comprises zeolite SSZ-32 and a Group 8-10 metal.

11. A process according to claim 10, wherein the zeolite SSZ-32 comprises a silicon oxide ($SiO_2$) to aluminum oxide ($Al_2O_3$) mole ratio (SAR) in the range of 25-37.

12. A process according to claim 10, wherein the zeolite SSZ-32 has a crystal size in the range of about 0.1 μm to about 0.4 μm.

13. A process according to claim 10, wherein the zeolite SSZ-32 as-synthesised, has a crystalline structure whose X-ray powder diffraction shows the following characteristic lines:

| d/n | Int. $I/I_o$ |
|---|---|
| 11.05 | 26 |
| 10.05 | 10 |
| 7.83 | 17 |
| 4.545 | 71 |
| 4.277 | 71 |
| 3.915 | 100 |
| 3.726 | 98. |

14. A process according to claim 1, wherein the hydroisomerisation catalyst further comprises zeolite SSZ-32x and a Group 8-10 metal.

15. A process according to claim 14, wherein the zeolite SSZ-32x comprises a silicon oxide ($SiO_2$) to aluminum oxide ($Al_2O_3$) mole ratio (SAR) in the range of 25-37.

16. A process according to claim 14, wherein the zeolite SSZ-32x has a crystal size in the range of about 100 to about 400 Angstrom.

17. A process according to claim 14, wherein the zeolite SSZ-32x as-synthesised, has a crystalline structure whose X-ray powder diffraction shows the following characteristic lines:

| 2θ | d-spacing (Å) | Intensity | Relative Intensity (%) ($I/I_o$ × 100) |
|---|---|---|---|
| 8.00 | 11.05 | 15 | 26 |
| 8.80 | 10.05 | 6 | 10 |
| 11.30 | 7.83 | 10 | 17 |
| 14.50 | 6.11 | 1 | 2 |
| 15.75 | 5.63 | 3 | 5 |
| 16.50 | 5.37 | 3 | 5 |
| 18.10 | 4.901 | 7 | 12 |
| 19.53 | 4.545 | 41 | 71 |
| 20.05 | 4.428 | 6 shoulder | 10 shoulder |
| 20.77 | 4.277 | 41 | 71 |
| 21.30 | 4.171 | 7 | 12 |
| 22.71 | 3.915 | 58 | 100 |
| 23.88 | 3.726 | 57 | 98 |
| 24.57 | 3.623 | 30 | 52 |
| 25.08 | 3.551 | 25 | 43 |

-continued

| 2θ | d-spacing (Å) | Intensity | Relative Intensity (%) (I/I$_o$ × 100) |
|---|---|---|---|
| 25.88 | 3.443 | 27 | 47 |
| 26.88 | 3.317 | 5 | 9 |
| 28.11 | 3.174 | 6 | 10. |

18. A process according to claim 1, wherein the hydroisomerisation further catalyst comprises zeolite SSZ-32, or zeolite SSZ-32x, and from about 0.05 to about 2.0 wt. % of a metal modifier.

19. A process according to claim 1, wherein the hydroisomerisation catalyst is a layered catalyst.

20. A process according to claim 19, wherein the hydroisomerisation catalyst comprises a first layer comprising a first hydroisomerisation catalyst and a second layer comprising a second hydroisomerisation catalyst, the first hydroisomerisation catalyst situated in a first hydroisomerisation zone and the second hydroisomerisation catalyst situated in a second hydroisomerisation zone.

21. A process according to claim 19, wherein the hydroisomerisation catalyst comprises at least one layer comprising zeolite SSZ-91.

22. A process according to claim 19, wherein the layered catalyst comprising a first layer comprising a first hydroisomerisation catalyst and a second layer comprising a second hydroisomerisation catalyst, wherein the first or second hydroisomerisation catalyst comprises zeolite SSZ-91 and the first and second hydroisomerisation catalysts are mutually exclusive.

23. A process according to claim 22, wherein the first and second hydroisomerisation catalyst comprise zeolite SSZ-91 and a Group 8-10 metal.

24. A process according to claim 1, wherein the hydroisomerisation catalyst is a layered catalyst and wherein the hydroisomerisation catalyst further comprises at least one layer comprising zeolite SSZ-32 or SSZ-32x.

25. A process according to claim 1, wherein the hydroisomerisation catalyst is a layered catalyst, the layered catalyst comprising a first layer comprising a first hydroisomerisation catalyst and a second layer comprising a second hydroisomerisation catalyst, wherein the first or second hydroisomerisation catalyst further comprises zeolite SSZ-32 or SSZ-32x and the first and second hydroisomerisation catalysts are mutually exclusive.

26. A process according to claim 25, wherein the first and second hydroisomerisation catalyst comprise zeolite SSZ-32 and a Group 8-10 metal.

27. A process according to claim 25, wherein the first and second hydroisomerisation catalyst comprise zeolite SSZ-32x and a Group 8-10 metal.

28. A process according to claim 1, wherein the Fischer-Tropsch feed has a 90% distillation temperature of less than about 700° F. (about 371° C.).

29. A process according to claim 1, wherein the diesel feedstock comprises or is a biocomponent feed selected from canola oil, corn oil, soy oils, castor oil, camelina oil, palm oil and combinations thereof.

30. A process according to claim 1, wherein contacting the diesel feedstock and the hydroisomerisation catalyst provides a diesel fuel exhibiting a lower cloud point and a lower pour point compared to the cloud point and pour point of the diesel feedstock.

31. A process for upgrading a diesel feedstock, the process comprising: contacting a diesel feedstock with a hydroisomerisation catalyst under hydroisomerisation conditions to provide a diesel fuel having a reduced cloud point and a reduced pour point compared to the cloud point and pour point of the diesel feedstock,
wherein the diesel feedstock comprises or is a biocomponent feed selected from vegetable oils and animal fats which comprise triglycerides and free fatty acids; or a Fischer-Tropsch feed having a 90% distillation temperature of less than about 750° F. (about 399° C.), and the hydroisomerisation catalyst comprises zeolite SaSZ-91.

32. A process according to claim 31, wherein the diesel fuel exhibits a cloud point at least 10° C. lower than the cloud point of the diesel feedstock and a pour point at least 10° C. lower than the pour point of the diesel feedstock, or a cloud point at least 20° C. lower than the cloud point of the diesel feedstock and a pour point at least 20° C. lower than the pour point of the diesel feedstock, or a cloud point at least 30° C. lower than the cloud point of the diesel feedstock and a pour point at least 30° C. lower than the pour point of the diesel feedstock.

33. A process for hydroisomerising a diesel feedstock, the process comprising contacting a diesel feedstock with a hydroisomerisation catalyst, wherein the diesel feedstock comprises or is a biocomponent feed or a Fischer-Tropsch feed, and the hydroisomerisation catalyst comprises zeolite SSZ-91, and wherein the diesel feedstock is contacted with the hydroisomerisation catalyst and hydrogen under hydroisomerisation conditions in an isomerization reactor, the hydroisomerisation conditions being:
temperature in the range of about 390° F. to about 800° F. (199° C. to 427° C.);
pressure in the range of about 15 to about 3000 psig (0.10 to 20.68 MPa gauge);
feed rate of diesel feedstock to the reactor containing the hydroisomerisation catalyst at a rate in the range from about 0.1 to about 20 h$^{-1}$ LHSV; and
hydrogen and diesel feedstock fed to the reactor in a ratio from about 2000 to about 10,000 standard cubic feet H$_2$ per barrel diesel feedstock (from about 360 to about 1800 m$^3$ H$_2$/m$^3$ feed).

34. A process for hydroisomerising a diesel feedstock, the process comprising contacting a diesel feedstock with a hydroisomerisation catalyst, wherein the diesel feedstock comprises or is a biocomponent feed or a Fischer-Tropsch feed, and the hydroisomerisation catalyst comprises zeolite SSZ-91, and further comprising contacting the diesel feedstock with a hydrotreating catalyst under hydrotreating conditions prior to contacting the diesel feedstock with the hydroisomerisation catalyst.

35. A process according to claim 34, the hydrotreating conditions being:
temperature in the range of about 390° F. to about 800° F. (199° C. to 427° C.);
pressure in the range of about 15 to about 3000 psig (0.10 to 20.68 MPa gauge);
feed rate of diesel feedstock to the reactor containing the hydrotreating catalyst at a rate in the range from about 0.1 to about 20 h$^{-1}$ LHSV; and
hydrogen and diesel feedstock fed to the reactor in a ratio from about 2000 to about 10,000 standard cubic feet H$_2$ per barrel diesel feedstock (from about 360 to about 1800 m$^3$ H$_2$/m$^3$ feed).

36. A process for providing a diesel fuel exhibiting a lower cloud point and a lower pour point compared to the cloud point and pour point of a diesel feedstock from which the diesel fuel is produced, the process comprising contacting a diesel feedstock and a hydroisomerisation catalyst comprising zeolite SSZ-91, under hydroisomerisation conditions to provide a diesel fuel exhibiting a lower cloud point and a lower pour point compared to the cloud point and pour point of a diesel feedstock from which the diesel fuel is produced, wherein the diesel feedstock comprises or is a biocomponent feed selected from vegetable oils and animal fats which comprise triglycerides and free fatty acids or a Fischer-Tropsch feed having a 90% distillation temperature of less than about 750° F. (about 399° C.).

* * * * *